US00RE50366E

(19) United States
(12) Reissued Patent
Fukuda et al.

(10) Patent Number: US RE50,366 E
(45) Date of Reissued Patent: Apr. 8, 2025

(54) HYDRAULIC SYSTEM FOR WORK MACHINE, AND WORK MACHINE

(71) Applicant: KUBOTA CORPORATION, Osaka (JP)

(72) Inventors: Yuji Fukuda, Sakai (JP); Kazuyoshi Arii, Sakai (JP); Keisuke Miura, Sakai (JP); Ryosuke Kinugawa, Sakai (JP); Ikuhiro Uotani, Sakai (JP); Satoshi Tajima, Sakai (JP); Ryohei Sumiyoshi, Sakai (JP); Kunihiro Suzuki, Sakai (JP)

(73) Assignee: KUBOTA CORPORATION, Osaka (JP)

(21) Appl. No.: 17/242,333

(22) Filed: Apr. 28, 2021

Related U.S. Patent Documents

Reissue of:
(64) Patent No.: 10,316,496
Issued: Jun. 11, 2019
Appl. No.: 15/390,536
Filed: Dec. 26, 2016

U.S. Applications:
(63) Continuation of application No. PCT/JP2015/054922, filed on Feb. 23, 2015.

(30) Foreign Application Priority Data

Sep. 30, 2014 (JP) ..... 2014-202381

(51) Int. Cl.
*E02F 9/22* (2006.01)
*E02F 3/34* (2006.01)
(Continued)

(52) U.S. Cl.
CPC ..... *E02F 9/2228* (2013.01); *E02F 9/2253* (2013.01); *E02F 9/2267* (2013.01);
(Continued)

(58) Field of Classification Search
CPC ..... E02F 9/2228; E02F 9/2253; E02F 9/2289; E02F 9/2285; E02F 9/2267; E02F 3/3414;
(Continued)

(56) References Cited

U.S. PATENT DOCUMENTS 9,702,117 B2 * 7/2017 Imaizumi ..... E02F 3/434
10,066,368 B2 * 9/2018 Hijikata ..... F15B 11/024
(Continued)

FOREIGN PATENT DOCUMENTS

JP 61-201969 9/1986
JP 63-63832 3/1988
(Continued)

OTHER PUBLICATIONS

International Search Report for corresponding International Application No. PCT/JP2015/054922, May 26, 2015.
(Continued)

*Primary Examiner* — William C Doerrler
(74) *Attorney, Agent, or Firm* — MORI & WARD, LLP

(57) ABSTRACT

A hydraulic system for a work machine includes a hydraulic pump to supply a pilot fluid, and a hydraulic switch valve to be switched to a plurality of switching positions based on a pilot pressure. The pilot pressure is a pressure of the pilot fluid supplied from the hydraulic pump. The hydraulic system includes a direction switch valve to apply a first pilot pressure to the hydraulic switch valve to switch the hydraulic switch valve into one of the plurality of switching positions. The hydraulic system includes a pressure applying device to apply a second pilot pressure to the hydraulic switch valve. The second pilot pressure is lower than the first pilot pressure.

27 Claims, 24 Drawing Sheets

(51) Int. Cl.

| | |
|---|---|
| ***F15B 11/042*** | (2006.01) |
| ***F15B 11/16*** | (2006.01) |
| ***F15B 13/042*** | (2006.01) |
| ***F16H 61/4035*** | (2010.01) |
| ***F16H 61/421*** | (2010.01) |
| ***F16H 61/423*** | (2010.01) |

(52) U.S. Cl.

CPC ..... *E02F 9/2285* (2013.01); *E02F 9/2289* (2013.01); *F15B 11/0426* (2013.01); *F15B 11/16* (2013.01); *F15B 13/0426* (2013.01); *F16H 61/4035* (2013.01); *F16H 61/421* (2013.01); *F16H 61/423* (2013.01); *E02F 3/3414* (2013.01); *F15B 2013/0428* (2013.01); *F15B 2211/30565* (2013.01); *F15B 2211/31582* (2013.01); *F15B 2211/327* (2013.01); *F15B 2211/35* (2013.01); *F15B 2211/355* (2013.01); *F15B 2211/36* (2013.01); *F15B 2211/6316* (2013.01); *F15B 2211/6355* (2013.01); *F15B 2211/665* (2013.01); *F15B 2211/6654* (2013.01); *F15B 2211/67* (2013.01); *F15B 2211/71* (2013.01); *F15B 2211/8606* (2013.01)

(58) Field of Classification Search

CPC .. F16H 61/421; F16H 61/423; F16H 61/4035; F15B 11/16; F15B 13/0426; F15B 11/0426; F15B 2013/0428; F15B 2211/36; F15B 2211/71; F15B 2211/31582; F15B 2211/67; F15B 2211/327; F15B 2211/30565; F15B 2211/355; F15B 2211/6654; F15B 2211/35; F15B 2211/6316; F15B 2211/6355; F15B 2211/8606; F15B 2211/665

See application file for complete search history.

(56) References Cited

U.S. PATENT DOCUMENTS

| | | | | |
|---|---|---|---|---|
| 2016/0115669 | A1* | 4/2016 | Gorman | E02F 3/32 701/50 |
| 2016/0312807 | A1* | 10/2016 | Kleitsch | F15B 11/163 |
| 2017/0107695 | A1 | 4/2017 | Fukuda et al. | |

FOREIGN PATENT DOCUMENTS

| | | | |
|---|---|---|---|
| JP | 4-143334 | | 5/1992 |
| JP | 5-255955 | | 10/1993 |
| JP | 7-14204 | U | 3/1995 |
| JP | 7-139510 | | 5/1995 |
| JP | 2001-271805 | | 10/2001 |
| JP | 2003-278710 | | 10/2003 |
| JP | 2003278710 | A * | 10/2003 |
| JP | 2011-47317 | | 3/2011 |
| JP | 2011-231468 | | 11/2011 |
| JP | 2013-036276 | | 2/2013 |
| JP | WO2016/051815 | | 4/2016 |
| WO | WO2016/051815 | | 4/2016 |

OTHER PUBLICATIONS

Japanese Office Action for corresponding JP Application No. 2016-551563, Nov. 28, 2017.

Office Action with Form PTO-892 Notice of References Cited issued by the United States Patent and Trademark Office for the parent U.S. Appl. No. 15/390,536, Aug. 10, 2018.

Notice of Allowance with Form PTO-892 Notice of References Cited issued by the United States Patent and Trademark Office for the parent U.S. Appl. No. 15/390,536, Feb. 1, 2019.

International Search Report for corresponding International Application No. PCT/JP2015/054922, dated May 26, 2015.

Japanese Office Action for corresponding JP Application No. 2016-551563, date Nov. 28, 2017.

* cited by examiner

HYDRAULIC SYSTEM FOR WORK MACHINE, AND WORK MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is *a reissue application of the U.S. Pat. No. 10,316,496, issued Jun. 11, 2019, which is* a continuation application of International Application No. PCT/JP2015/054922, filed [Feb. 23, 2015] *Mar. 30, 2015*, which claims priority to Japanese Patent Application No. 2014-202381, filed Sep. 30, 2014. The contents of these applications are incorporated herein by reference in their entirety.

BACKGROUND OF THE INVENTION

Field of the Invention

The present invention relates to a hydraulic system for a work machine and to the work machine.

Discussion of the Background

Japanese Unexamined Patent Application Publication No. 2013-36276 has disclosed a hydraulic system for a work machine such as a skid steer loader and a compact truck loader. The hydraulic system employs a various displacement hydraulic motor to change a speed of the work machine.

In addition, Japanese Unexamined Patent Application Publication No. 2011-231468 has disclosed a work machine having a hydraulic system. The hydraulic system includes a main pump (a first pump) configured to supply an operation fluid to a hydraulic actuator and a sub pump (a second pump) configured to increase a flow rate of an operation fluid being supplied to the hydraulic actuator.

SUMMARY OF THE INVENTION

A hydraulic system for a work machine includes a hydraulic pump to supply a pilot fluid, and a hydraulic switch valve to be switched to a plurality of switching positions based on a pilot pressure. The pilot pressure is a pressure of the pilot fluid supplied from the hydraulic pump. The hydraulic system includes a direction switch valve to apply a first pilot pressure to the hydraulic switch valve to switch the hydraulic switch valve into one of the plurality of switching positions. The hydraulic system includes a pressure applying device to apply a second pilot pressure to the hydraulic switch valve. The second pilot pressure is lower than the first pilot pressure.

A hydraulic system for a work machine includes a hydraulic pump to supply a pilot fluid, and a hydraulic switch valve to be switched to a plurality of switching positions based on a pilot pressure. The pilot pressure is a pressure of the pilot fluid supplied from the hydraulic pump. The hydraulic system includes a direction switch valve to apply a first pilot pressure to the hydraulic switch valve to switch the hydraulic switch valve into one of the plurality of switching positions. The hydraulic system includes a speed reducing device to reduce a speed of changing the pilot pressure to be changed to the first pilot pressure.

A work machine comprising the hydraulic system mentioned above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
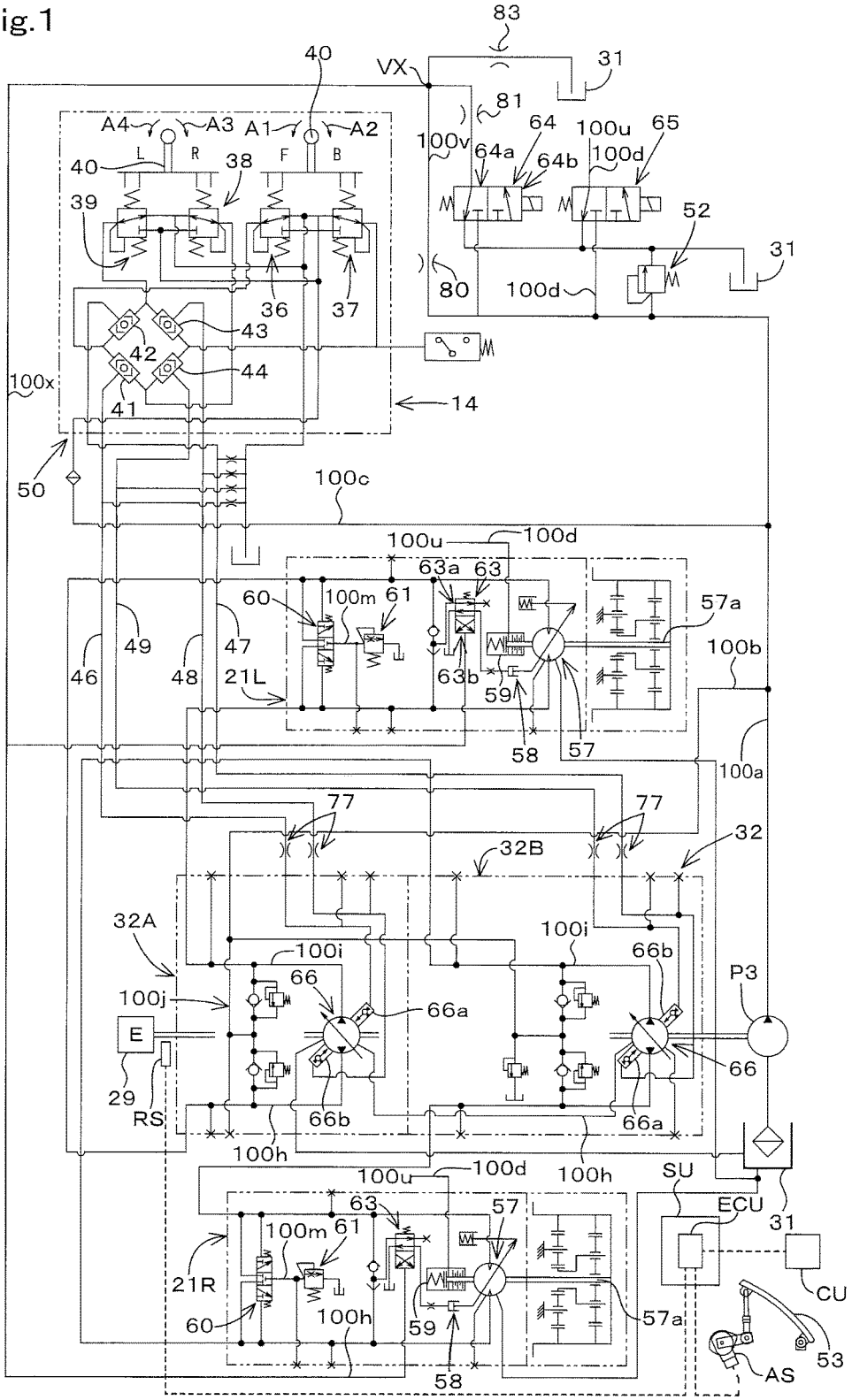
FIG. 1 is a view illustrating a hydraulic circuit of a hydraulic system according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, embodiments of the present invention will describe below a hydraulic system for a work machine and a work machine having the hydraulic system.

First Embodiment

A whole configuration of a work machine 1 according to a first embodiment of the present invention will be explained first.

Figure 20:
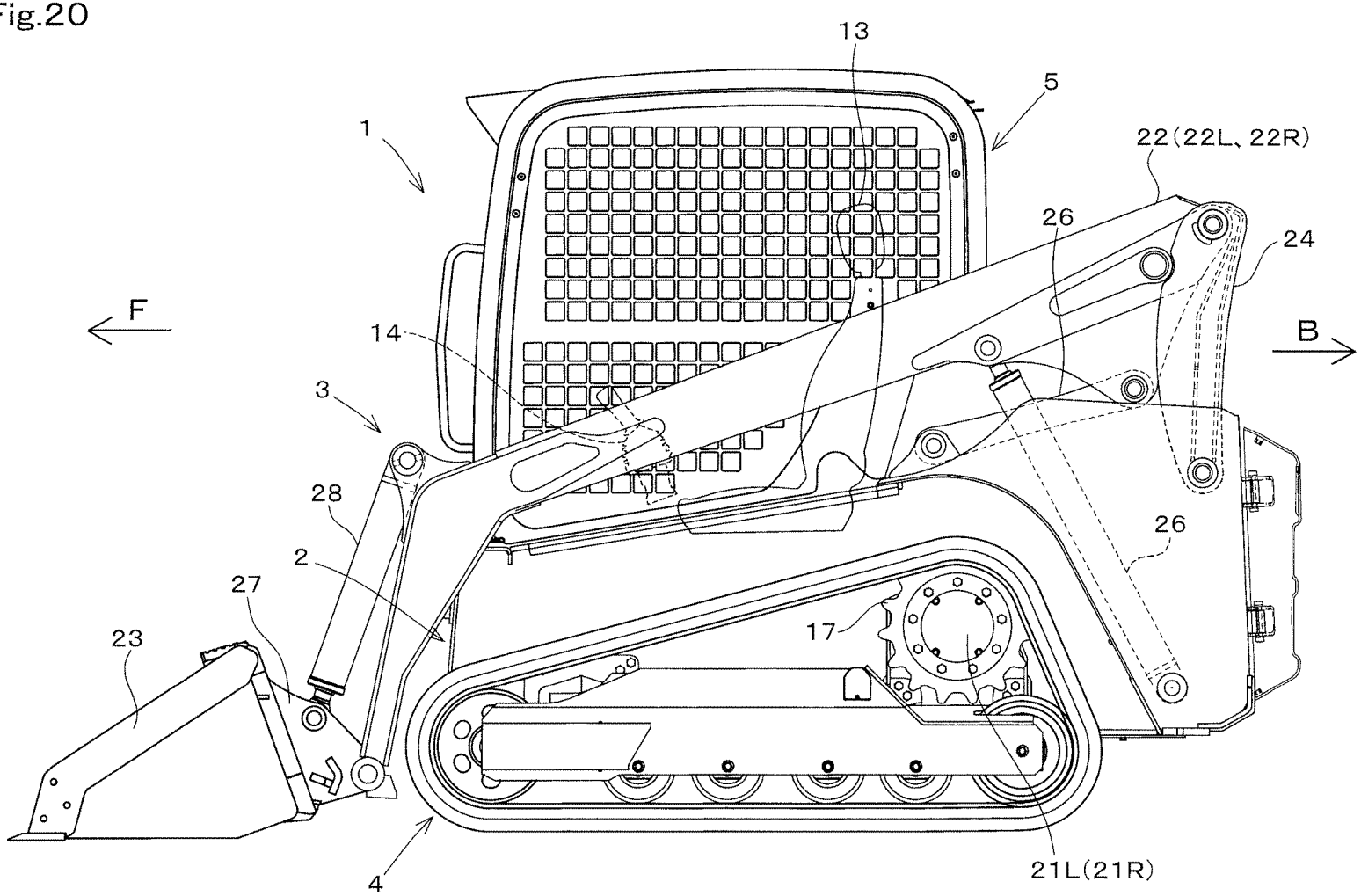
FIG. 20 is a side view illustrating a track loader as an example of a work machine according to the embodiments of the present invention.
Figure 21:
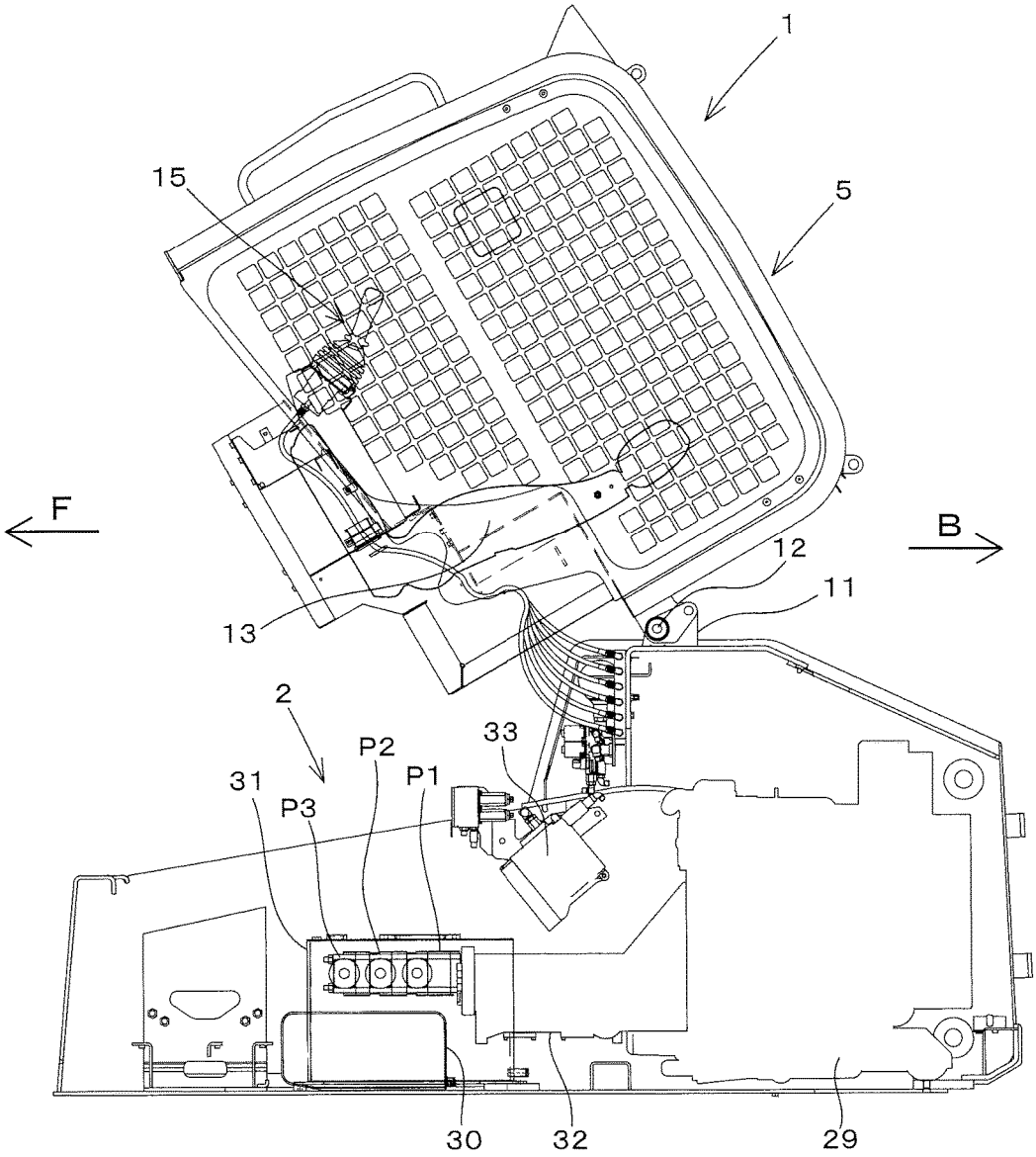
FIG. 21 is a side view illustrating a part of the track loader lifting up a cabin according to the embodiments of the present invention.

As shown in FIG. 20 and FIG. 21, the work machine 1 according to the embodiment includes a machine frame (a machine body) 2, an operation device 3 attached to the machine frame 2, and travel devices 4 supporting the machine frame 2. FIG. 20 to FIG. 21 show a Track Loader (TL) as an example of the work machine 1 according to the embodiment of the present invention. The work machine 1 according to the embodiment however is not limited to the Track Loader, and may be other types of the work machine 1, for example, a tractor, a Skid Steer Loader (SSL), a Compact Track Loader (CTL), a backhoe, and the like. Hereinafter, in explanations of all the embodiments of the present invention, a forward direction (a direction shown by an arrowed line F in FIG. 20 and FIG. 21) corresponds to a front side of an operator seating on an operator seat of the work machine 1, a backward direction (a direction shown by an arrowed line B in FIG. 20 and FIG. 21) corresponds to a back side of the operator, a leftward direction (a direction vertically extending from a back surface to a front surface of FIG. 20 and FIG. 21) corresponds to a left side of the operator, and a rightward direction (a direction vertically extending from the front surface to the back surface of FIG. 20 and FIG. 21) corresponds to a right side of the operator.

A cabin 5 is mounted on a front portion included in an upper portion of the machine frame 2. A rear portion of the cabin 5 is supported on a support bracket 11 of the machine frame 2, and is capable of freely swinging about a support shaft 12. A front portion of the cabin 5 is capable of being mounted on the front portion of the machine frame 2.

An operator seat 13 is disposed inside the cabin 5. An operation device 14 for traveling is arranged on one of a right side and a left side (for example, on the left side) of the operator seat 13, the operation device 14 for traveling being used for operating the travel devices 4.

Each of the travel devices 4 is constituted of a crawler travel device. One of the travel devices 4 is disposed under the left side of the machine frame 2. The other one of the travel devices 4 is disposed under the right side of the machine frame 2. The travel devices 4 are capable of being driven by driving forces of travel motors 21L and 21R (wheel motors) that employ the hydraulic driving system.

The operation device 3 includes a pair of booms 22 and a bucket 23 (an operation tool), the a pair of booms 22 including a left boom 22L and a right boom 22R, the bucket 23 being attached to tip ends of the booms 22. The left boom 22L is arranged on the left side of the machine frame 2. The right boom 22R is arranged on the right side of the machine frame 2. The left boom 22L and the right boom 22R are coupled to each other by a coupler. Each of the left boom 22L and the right boom 22R is supported by a first lift link 24 and a second lift link 25. A lift cylinder 26 is disposed between a side close to a base portion of each of the left boom 22L and the right boom 22R and a rear lower portion of the machine frame 2, the lift cylinder 26 being constituted of a double action hydraulic cylinder. The lift cylinder 26 disposed on the right side and the right cylinder 26 disposed on the left side are stretched and shortened simultaneously, and in this manner the left boom 22L and the right boom 22R are swung upward and downward. Attachment brackets 27 are pivotally coupled to sides close to tip ends of the left boom 22L and the right boom 22R respectively, and thus is capable of being turned about a lateral axis extending from the left to the right. A back surface of the bucket 23 is attached to the attachment bracket 27 disposed on the left side and to the attachment bracket 27 disposed on the right side.

In addition, a tilt cylinder 28 is disposed between the attachment brackets 27 and intermediate portions of the tip end sides of the left boom 22L and the right boom 22R, the tilt cylinder 28 being constituted of a double action hydraulic cylinder. The tilt cylinder 28 is stretched and shortened, and thus the bucket 23 is swung (in a shoveling operation and a dumping operation).

The bucket 23 is configured to be attached to and detached from the attachment bracket 27. Various types of attachments (a hydraulically-driven operation tool described later having a hydraulic actuator) can be attached to the attachment brackets 27 after detachment of the bucket 23, and thus configurations for various types of operations other than the excavation (or another types of excavation) can be provided.

An engine 29 is disposed on a rear portion of a bottom wall 6 in the machine frame 2, and a fuel tank 30 and an operation fluid tank 31 are disposed on a front portion of the bottom wall 6 in the machine frame 2.

A hydraulic drive device 32 is disposed anterior to the engine 29, the hydraulic drive device 32 being configured to drive the travel motor 21R disposed on the right side and the travel motor 21L disposed on the left side. A first pump P1, a second pump P2, and a third pump P3 are disposed anterior to the hydraulic drive device 32, each of the first pump P1, the second pump P2, and the third pump P3 being constituted of a hydraulic pump. A control valve 33 (a hydraulic pressure control device) for the operation device 3 is disposed on an intermediate portion of a right side wall 7 of the machine frame 2, the intermediate portion being intermediate in a front to rear direction (a longitudinal direction being perpendicular to the lateral direction).

A hydraulic system for the work machine according to the embodiment will be explained next.

FIG. 1 illustrates a whole of the hydraulic system according to the embodiment, the hydraulic system being a hydraulic system for traveling (a traveling hydraulic system) of the work machine 1.

Each of the first pump P1, the second pump P2, and the third pump P3 that are hydraulic pumps is constituted of a constant displacement gear pump being configured to be driven by a motive power of the engine 29.

The first pump P1 (a main pump) is used for driving the lift cylinder 26, the tilt cylinder 28, or a hydraulic actuator of an attachment being attached to a tip end portion of the boom 22. In a case where a hydraulic actuator of the hydraulic attachment attached to the tip end portion of the boom 22 is a hydraulic actuator having a large displacement, the second pump P2 (a sub pump) is used for increasing a flow rate of an operation fluid to be supplied to the hydraulic actuator. The third pump P3 (a pilot pump, a charge pump) is used for mainly supplying a pressure of control signal (a pilot pressure).

The hydraulic drive device 32 is a device configured to drive the travel motor 21L and the travel motor 21R, and includes a drive circuit 32A for the left travel motor 21L (that is, a left drive circuit 32A) and a drive circuit 32B for the right travel motor 21R (that is, a right drive circuit 32B).

The drive circuit 32A includes an HST pump 66 (a hydraulic pump for traveling). The HST pump 66 is connected to an HST motor 57 of the travel motor 21L and to an HST motor 57 of the travel motor 21R by a pair of speed-change fluid tubes 100h and 100i (speed-change fluid paths 100h and 100i). The drive circuit 32B meanwhile has a configuration similar to the configuration of the drive circuit 32A, and an explanation of the drive circuit 32A will be omitted.

The HST pump 66 is a variable displacement axial pump employing a swash plate, the variable displacement axial pump being configured to be driven by the engine 29, and further is a pilot-operation hydraulic pump (a variable displacement hydraulic pump employing a swash plate) that is configured to move the swash plate by using the pilot pressure, thereby changing an angle of the swash plate. In particular, the HST pump 66 includes a forward-travel pressure receiving part 66a (a forward-travel pressure receiver 66a) and a backward-travel pressure receiving part 66b (a backward-travel pressure receiver 66b) that receive the pilot pressure.

The angle of the swash plate is changed by the pilot pressure applied to the pressure receiving part 66a and the pressure receiving part 66b. When the angle of the swash plate is changed, a discharge direction of and a discharge rate of an operation fluid are varied, and thus revolution powers of the travel motors 21L and 21R are varied.

When a revolution speed of the HST pump 66 is increased, a discharge rate of the HST pump 66 is increased, and thus a traveling speed is increased. The revolution speed of the HST pump 66, that is, the discharge rate of the HST pump 66 is varied by an output power of the engine 29. The work machine 1 includes an acceleration operation member (an acceleration pedal or an acceleration lever) 53. When an operation amount of the acceleration operation member 53 is zero, the revolution speed of the engine 29 is at an idling speed (for example, 1150 rpm). In addition, when the acceleration operation member 53 is fully operated to the maximum extent, the revolution speed of the engine 29 is at the maximum speed (for example, 2480 rpm).

The engine speed is controlled by, for example, an electric-controlled fuel supply device SU employing a common-rail. The electric-controlled fuel supply device SU includes a common-rail, a supply pump, an injector, and a controller ECU. The common-rail is constituted of a cylindrical tube to store the fuel. The supply pump is configured to pressurize the fuel stored in the fuel tank 30 and thus supply the fuel to the common-rail. The injector is configured to inject the highly-pressurized fuel to cylinders of the engine 29, the highly-pressurized fuel being stored in the common-rail. The controller ECU is configured to control a fuel injection amount of the injector.

An acceleration sensor AS and a revolution sensor RS are connected to the controller ECU by transmission wires (transmission paths), the acceleration sensor AS being configured to detect an operation amount of the acceleration operation member 53, the revolution sensor RS being configured to detect an actual revolution speed of the engine 29. Detection signals of the acceleration sensor AS and the revolution sensor RS are inputted to the controller ECU.

Then, the fuel injection amount of the injector is controlled based on the detection signals of the acceleration sensor AS and the revolution sensor RS by the controller ECU such that the engine 29 runs at a revolution speed (a target engine revolution speed) corresponding to the operation amount of the acceleration operation member 53 (being determined by the acceleration operation member 53).

As shown in FIG. 1, a discharge fluid tube 100a is connected to a discharge port of the third pump P3, the discharge fluid tube 100a being configured to supply a discharged fluid (the pilot fluid) discharged from the third pump P3. In FIG. 1, fluid tubes connected to the first pump P1 and the second pump P2 are not shown, and the fluid tubes will be shown in an eighth embodiment described below (in FIG. 9).

A first supply tube (a first supply path) 100b, a second supply tube (a second supply path) 100c, and third supply tube (a third supply path) 100d are branched from the discharge fluid tube 100a. A second speed switch valve 64 is connected to a terminal end of the discharge fluid tube 100a of the third pump P3. A relief valve 52 is connected to a downstream portion of the discharge fluid tube 100a, the relief valve 52 being configured to set the maximum pressure of the third pump P3.

A pump port 50 of the travel operation device 14 is connected to the second supply tube 100c, and the pilot fluid that is the discharge fluid of the third pump P3 is supplied to the travel operation device 14 through the second supply tube 100c.

The travel operation device 14 includes a forward-driving pilot valve 36, a backward-driving pilot valve 37, a right-turning pilot valve 38, a left-turning pilot valve 39, a travel lever 40, a first shuttle valve 41, a second shuttle valve 42, a third shuttle valve 43, and a fourth shuttle valve 44. The pilot valves 37, 38, and 39 are operated by a common lever, that is, a single travel lever 40.

The travel lever 40 is capable of being tilted forward, backward, rightward, and leftward from a neutral position and toward a diagonal direction between any combination of the forward direction, the backward direction, the rightward direction, and the leftward direction from the neutral position. The tilting operation of the travel lever 40 operates each of the pilot valves 37, 38, and 39 of the travel operation device 14, and the pilot pressures being proportional to the operation amount of the travel lever 40 from the neural position are outputted from the secondary ports of the operated pilot valves 37, 38, and 39.

When the travel lever 40 is tilted forward (toward a direction of an arrowed line A1 in FIG. 1), the forward-driving pilot valve 36 is operated, and thus the pilot pressure is outputted from the pilot valve 36. The pilot pressure is applied from the first shuttle valve 41 to the forward-travel pressure receiving part 66a of the left drive circuit 32A through the first flow tube 46 and applied from the second shuttle valve 42 to the forward-travel pressure receiving part 66a of the right drive circuit 32B through the second flow tube 47. In this manner, output shafts 57a of the left travel motor 21L and the right travel motor 21R revolve forward (revolve in the forward direction) at a speed being proportional to the tilting amount of the travel lever 40, and thus the track loader 1 travels forward and straight.

In addition, when the travel lever 40 is tilted backward (toward a direction of an arrowed line A2 in FIG. 1), the backward-driving pilot valve 37 is operated, and thus the pilot pressure is outputted from the pilot valve 37. The pilot pressure is applied from the third shuttle valve 43 to the backward-travel pressure receiving part 66b of the left drive circuit 32A through the third flow tube 48 and applied from the fourth shuttle valve 44 to the backward-travel pressure receiving part 66b of the right drive circuit 32B through the fourth flow tube 49. In this manner, the output shafts 57a of the left travel motor 21L and the right travel motor 21R revolve backward (revolve in the backward direction) at a speed being proportional to the tilting amount of the travel lever 40, and thus the track loader 1 travels backward and straight.

In addition, when the travel lever 40 is tilted rightward (toward a direction of an arrowed line A3 in FIG. 1), the right-turning pilot valve 38 is operated, and thus the pilot pressure is outputted from the pilot valve 38. The pilot pressure is applied from the first shuttle valve 41 to the forward-travel pressure receiving part 66a of the left drive circuit 32A through the first flow tube 46 and applied from the fourth shuttle valve 44 to the backward-travel pressure receiving part 66b of the right drive circuit 32B through the fourth flow tube 49. In this manner, the output shafts 57a of the left travel motor 21L revolves forward and the output shafts 57a of the right travel motor 21R revolves backward, and thus the track loader 1 turns right.

In addition, when the travel lever 40 is tilted leftward (toward a direction of an arrowed line A4 in FIG. 1), the left-turning pilot valve 39 is operated, and thus the pilot pressure is outputted from the pilot valve 39. The pilot pressure is applied from the second shuttle valve 42 to the forward-travel pressure receiving part 66a of the right drive circuit 32B through the second flow tube 47 and applied from the third shuttle valve 43 to the backward-travel pressure receiving part 66b of the left drive circuit 32A through the third flow tube 48. In this manner, the output shafts 57a of the right travel motor 21R revolves forward and the output shafts 57a of the left travel motor 21L revolves backward, and thus the track loader 1 turns left.

In addition, when the travel lever 40 is tilted toward the diagonal direction, the revolution direction of and the revolution speed of the output shaft 57a of each of the travel motors 21l and 21R are determined by a differential pressure between the pilot pressures applied to the forward-travel pressure receiving part 66a and the backward-travel pressure receiving part 66b that are included in the drive circuits 32A and 32B, and thus the track loader 1 turns rightward or leftward traveling forward or backward.

That is, when the travel lever 40 is tilted diagonally forward left, the track loader 1 turns leftward traveling forward at a speed corresponding to an angle of the tilting of the travel lever 40. When the travel lever 40 is tilted diagonally forward right, the track loader 1 turns rightward traveling forward at a speed corresponding to an angle of the tilting of the travel lever 40. When the travel lever 40 is tilted diagonally backward left, the track loader 1 turns leftward traveling backward at a speed corresponding an angle of the tilting of the travel lever 40. When the travel lever 40 is tilted diagonally backward right, the track loader 1 turns rightward traveling backward at a speed corresponding an angle of the tilting of the travel lever 40.

Each of the first flow tube 46, the second flow tube 47, the third flow tube 48, and the fourth flow tube 49 includes a shock-absorbing throttle 77. The pilot fluid from the travel operation device 14 is supplied to the forward-travel pressure receiving part 66a and the backward-travel pressure receiving part 66b of the HST pump 66 through the shock-absorbing throttle 77. The pilot fluid returns from the forward-travel pressure receiving part 66a and the backward-travel pressure receiving part 66b through the shock-absorbing throttle 77. In this manner, the vehicle speed is prevented from being rapidly changed.

Each of the travel motor 21L and the travel motor 21R includes the HST motor 57 (a hydraulic motor for traveling), a swash plate switch cylinder 58, a brake cylinder 59, a flushing valve 60, and a flushing relief valve 61. The HST motor 57 is a variable displacement axial pump employing a swash plate, the variable displacement axial pump being configured to change the speed to two speeds, high and low. The swash plate switch cylinder 58 switches an angle of the swash plate of the HST motor 57, and thereby changing the speed of the HST motor 57 to two speeds, high and low. The brake cylinder 59 brakes the output shaft 57a of the HST motor 57 (the output shaft 57a of the travel motor 21L). The right travel motor 21R has a configuration similar to the configuration of the left travel motor 21L, and detailed explanations of the right travel motor 21R will be omitted in the embodiment, and detailed illustrations of the right travel motor 21R will be omitted in the drawings.

A pilot-operation hydraulic switch valve 63 (also referred to as a cylinder switch valve) determines whether a pressured fluid is applied to the swash plate switch cylinder 58. The cylinder switch valve (a hydraulic switch valve) 63 is constituted of a two-position switch valve having a spool, the spool being configured to be moved to a first switch position 63a and to a second switch position 63b on the basis of a pressure (the pilot pressure) of the pilot fluid. The spool of the cylinder switch valve 63 moves to the second switch position 63b when the pilot pressure reaches a predetermined pressure (hereinafter referred to as a set pressure), and is returned to the first switch position 63a by a spring when the pilot pressure is less than the set pressure.

When the spool of the cylinder switch valve 63 moves to the first switch position 63a, the pilot fluid is released from the swash plate switch cylinder 58, and thus the HST motor 57 is changed to a first speed (Low). When the spool of the cylinder switch valve 63 moves to the second switch position 63b, the pilot fluid is supplied to the swash plate switch cylinder 58, and thus the HST motor 57 is changed to a second speed (High).

The cylinder switch valve 63 is switched by the second speed switch valve (direction switch valve) 64 employing an electromagnetic method. A second fluid tube (a second path)

100x connects the cylinder switch valve 63 to the second speed switch valve 64. The second speed switch valve 64 is constituted of a two-position switch valve. The two-position switch valve is configured to be magnetized and thereby switched to a first position 64a and to a second position 64b. When the second speed switch valve (direction switch valve) 64 is switched to the second position 64b, the second speed switch valve 64 connects the discharge fluid tube 100a (also referred to as a fourth fluid tube 100a) of the third pump P3 to the cylinder switch valve 63. Then, the pilot fluid discharged from the third pump P3 passes through the second speed switch valve 64 and the second fluid tube 100x, and thus is applied to the spool of the cylinder switch valve 63. The spool of the cylinder switch valve 63 is moved to the second switch position 63b by a pressure (the pilot pressure) of the pilot fluid applied from the second speed switch valve to the cylinder switch valve 63. On the other hand, when the second speed switch valve (direction switch valve) 64 is switched to the first position 64a, the second speed switch valve 64 connects the operation fluid tank 31 to the cylinder switch valve 63, and then discharges the pilot fluid in the cylinder switch valve 63 to the operation fluid tank 31. In this manner, the pilot pressure if the cylinder switch valve 63 is reduced, and thus the spool of the cylinder switch valve 63 is switched to the first switch position 63a.

The flushing valve 60 is switched by pressures in the speed-change fluid tubes 100h and 100i on the high pressure side such that the speed-change fluid tubes 100h and 100i on the low pressure side is connected to a flushing relief fluid tube 100m, and releases a part of the operation fluid in the speed-change fluid tubes 100h and 100i on the low pressure side to a fluid pool in the housings of the travel motors 21L and 21R through the flushing relief fluid tube 100m such that the operation fluid is filled into the speed-change fluid tubes 100h and 100i on the low pressure side. The flushing relief valve 61 is disposed on an intermediate portion of the flushing relief fluid tube 100m.

In addition, the brake cylinder 59 incorporates a spring, the spring being configured to brake the output shaft 57a of the HST motor 57, and is connected to the third supply tube 100d. A brake release valve 65 is disposed on the third supply tube 100d, the brake release valve 65 being constituted of a two-position switch valve employing an electromagnetic method. When the brake release valve 65 is magnetized, the pilot fluid of the third supply tube 100d is applied to the brake cylinder 59, and thereby releasing the braking of the output shaft 57a of the HST motor 57.

The hydraulic system according to the embodiment includes a pressure applying part (a pressure applying device) and/or a speed reducing part (a speed reducing device or a speed reducer). The pressure applying part is configured to apply a pressure to the cylinder switch valve 63, the pressure being lower than the pilot pressure (the set pressure) being to move the spool of the cylinder switch valve 63 to the second switch position 63b. The speed reducing part is configured to reduce a speed of varying the pilot pressure, the pilot pressure being to be applied to the cylinder switch valve 63. The speed of varying is an increase rate of the pilot pressure per unit time and a decrease rate of the pilot pressure per unit time. In other words, the speed of varying is a speed of increasing the pilot pressure and a speed of decreasing the pilot pressure.

Concrete configurations of the pressure applying part and the speed reducing part will be explained below.

In the hydraulic system shown in FIG. 1 according to the embodiment (the first embodiment), the pressure applying part includes a first fluid tube 100v and a first throttle part (a first throttle) 80. The first fluid tube 100v is a fluid tube (a fluid path) connecting the third pump P3 to the cylinder switch valve (the hydraulic switch valve) 63 without being connected to the second speed switch valve (the direction switch valve) 64. In particular, the first fluid tube 100v is branched from the discharge fluid tube 100a in the vicinity of the second speed switch valve 64 and is connected to the second fluid tube 100x. That is, the pilot fluid discharged from the third pump P3 passes through the first fluid tube 100v, and thus flows from the discharge fluid tube 100a to the cylinder switch valve 63 without passing through the second speed switch valve 64. The first throttle part 80 is a throttle valve disposed on an intermediate portion of the first fluid tube 100v. The first throttle part 80 sets a pressure (the pilot pressure) of the pilot fluid flowing in the first fluid tube 100v to be lower than a pilot pressure (the set pressure referred to as a first pilot pressure) to move the spool of the cylinder switch valve 63 to the second switch position 63b. In this manner, a pressure (a second pilot pressure) lower than the pilot pressure (the set pressure) is constantly applied to the cylinder switch valve 63, the pilot pressure (the set pressure) being to move the spool of the cylinder switch valve 63 to the second switch position 63b.

The provision of the pressure applying part applies a pre-pressure (the second pilot pressure) less than the set pressure to the cylinder switch valve 63 through the first fluid tube 100v and the first throttle part 80 even when the second speed switch valve (the direction switch valve) 64 is at the first position 64a. Thus, when the second speed switch valve 64 is switched to the second position 64b, the pilot pressure of the cylinder switch valve 63 reaches the set pressure quickly. In this manner, the spool of the cylinder switch valve 63 is switched quickly from the first switch position 63a to the second switch position 63b, and thereby improving a switching speed of the HST motor 57 from the first speed to the second speed.

In the present embodiment and embodiments described below, it is preferable for the pressure (the pre-pressure) to be slightly lower than the set pressure (for example, to be equal to or more than 80% of the set pressure), the pre-pressure being applied to the hydraulic switch valve (the cylinder switch valve 63 and a high flow valve 145 described later) by the pressure applying part. When the pressure applied by the pressure applying part is set to be slightly lower than the set pressure, that setting of the pressure reduces time required to rise the pilot pressure to the set pressure of the hydraulic switch valve (the cylinder switch valve 63 and a high flow valve 145 described later), and thus responsibility of the switching is improved.

In the hydraulic system according to the first embodiment, the speed reducing part includes the second fluid tube 100x and a second throttle part (a second throttle) 81. The second throttle part 81 is a throttle valve disposed on the second fluid tube 100x between the second speed switch valve 64 and a confluence part VX where the second fluid tube 100x and the first fluid tube 100v are joined to each other.

The second throttle part 81 restricts an amount of the pilot fluid flowing in the second fluid tube 100x and reduces the pressure (the pilot pressure) of the pilot fluid flowing from the second speed switch valve 64 to the cylinder switch valve 63. In this manner, the second throttle part 81 reduces the speed of varying of the pilot pressure applied to the cylinder 63 and thereby reduces a speed of moving of the spool of the cylinder switch valve 63. As the result, that configuration reduces a shock caused by the switching of the HST motor 57 from the first speed to the second speed.

Second Embodiment

Figure 2:
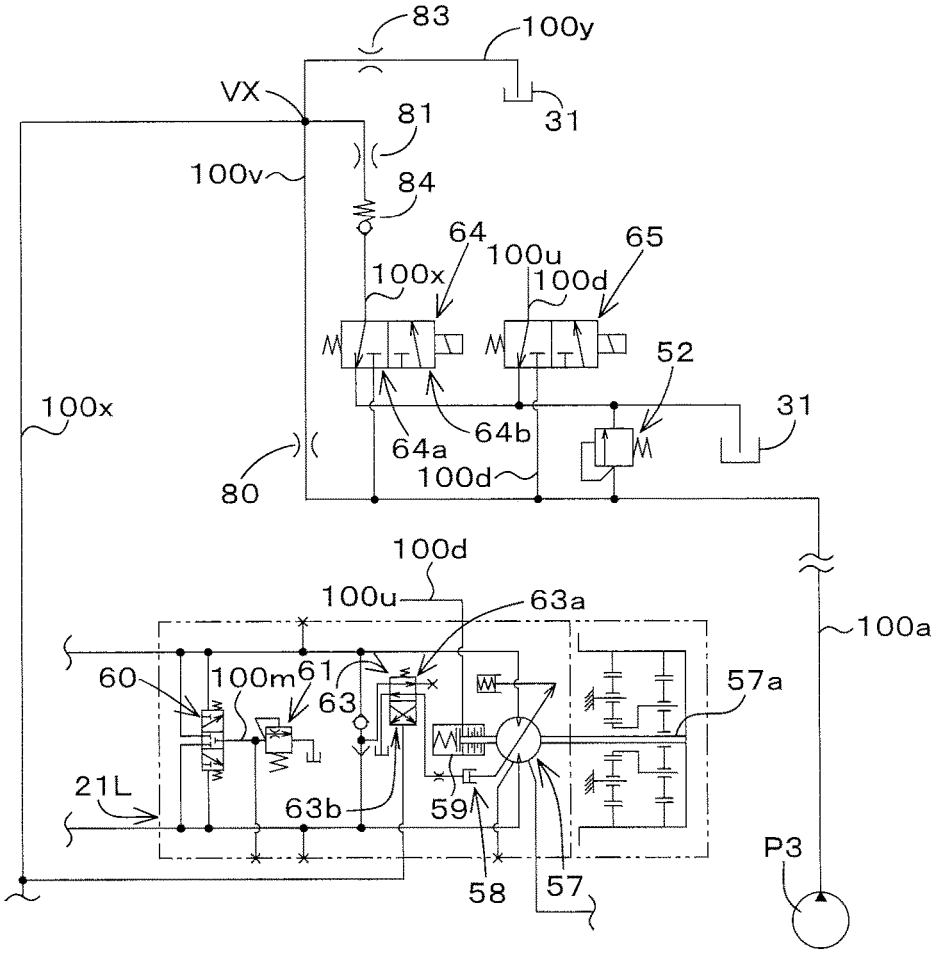
FIG. 2 is a view illustrating a hydraulic circuit of a hydraulic system according to a second embodiment of the present invention.

FIG. 2 illustrates a hydraulic system according to a second embodiment of the present invention.

Referring to FIG. 2, the second embodiment of the present invention will be explained below. Explanations of components similar to the components of the first embodiment will be omitted by being given reference numerals identical to the reference numerals of the first embodiment. In the second embodiment, components different from the components of the first embodiment will be explained mainly.

The hydraulic system according to the second embodiment includes the pressure applying part having a similar configuration described in the first embodiment, and includes a speed reducing part having a configuration different from the description of the first embodiment.

The speed reducing part according the second embodiment includes the second fluid tube 100x, the second throttle part 81, a third fluid tube (a third fluid path) 100y, and a third throttle part (a third throttle) 83. A first check valve 84 is disposed on an upper stream portion of the second throttle part 81 (on a side close to the third pump P3) between the second speed switch valve 64 and a confluence part VX. The first check valve 84 allows the pilot fluid to flow from the second speed switch valve 64 to the cylinder switch valve 63 when a pressure of the pilot fluid is equal to or more than a predetermined pressure, and blocks the pilot fluid flowing from the cylinder switch valve 63 to the second speed switch valve 64.

The third fluid tube 100y is a fluid tube connecting the confluence part VX to the operation fluid tank 31. The third throttle part 83 is a throttle valve disposed on the third fluid tube 100y between the confluence part VX and the operation fluid tank 31. The third throttle part 83 restricts an amount of the pilot fluid flowing in the third fluid tube 100y and reduces the pressure (the pilot pressure) of the pilot fluid flowing in the third fluid tube 100y.

In the switching from the first speed to the second speed in the hydraulic system according to the second embodiment, an amount (a flow-in amount) of the pilot fluid flowing into the cylinder switch valve 63 through the second throttle part 81 of the second fluid tube 100x is increased to be larger than an amount (a discharge amount) of the pilot fluid discharged from the cylinder switch valve 63 through the third throttle part 83 of the third fluid tube 100y. In this manner, the pilot pressure applied to the cylinder switch valve 63 is increased, and thereby the spool of the cylinder switch valve 63 is switched to the second switch position 63b. In that case, throttling amounts of the second throttle part 81 and the third throttle part 83 are balanced appropriately, and a balance between the flow-in amount and the discharge amount is optimized. Thus, the speed of varying (increasing) of the pilot pressure applied to the cylinder switch valve 63 can be reduced. The above-mentioned configuration absorbs (releases) a shock of the changing of speed.

On the other hand, in the switching from the second speed to the first speed, the pilot fluid is discharged from the cylinder switch valve 63 through the third throttle part 83 of the third fluid tube 100y. In that case, the first check valve 84 is disposed on the second fluid tube 100x, and thus the pilot fluid in the cylinder switch valve 63 is discharged through the third fluid tube 100y without being discharged through the second fluid tube 100x being on an upper stream side of the first check valve 84.

The discharging of the pilot fluid from the third fluid tube 100y reduces the pilot pressure applied to the cylinder switch valve 63, and thereby the spool of the cylinder switch valve 63 is switched to the first switch position 63a. In that case, the third throttle part 83 is disposed on the third fluid tube 100y. Thus, the speed of varying (decreasing) of the pilot pressure applied to the cylinder switch valve 63 can be reduced. The above-mentioned configuration absorbs (releases) a shock of the changing of speed.

In addition, the pilot fluid in the cylinder switch valve 63 is discharged to the operation fluid tank 31 in both of the first speed and the second speed. In this manner, the pilot fluid circulates and is warmed, and thus the responsibility to the speed changing operation is prevented from deterioration caused by reduction of temperature of the pilot fluid. Thus, changing of the responsibility (feeling) to the speed changing, the changing being caused by reduction of temperature of the pilot fluid is suppressed.

In the hydraulic system according to the second embodiment, the configuration of the pressure applying part is similar to the configuration described in the first embodiment. However, the third fluid tube 100y and the third throttle part 83 both provided as the speed reducing part influences the pilot pressure (the pre-pressure) applied to the cylinder switch valve 63. The influence will be explained below.

The hydraulic system according to the second embodiment is capable of controlling the throttling amount of the first throttle part 80 and the throttling amount of the third throttle part 83, and thereby controlling an amount (a supply amount) of the pilot fluid supplied to the cylinder switch valve 63 through the first fluid tube 100v and an amount (a discharge amount) of the pilot fluid discharged from the cylinder switch valve 63 to the operation fluid tank 31 through the third fluid tube 100y. In this manner, the throttling amount of the first throttle part 80 and the throttling amount of the third throttle part 83 are balanced appropriately, and a balance between the flow-in amount and the discharge amount is optimized. Thus, a pressure lower than the pilot pressure (the set pressure) to move the spool of the cylinder switch valve 63 to the second switch position 63b is constantly applied to the cylinder switch valve 63.

In this manner, a pre-pressure less than the set pressure is applied to the cylinder switch valve 63 even when the second speed switch valve 64 is at the first position 64a. Thus, when the second speed switch valve 64 is switched to the second position 64b, the pilot pressure of the cylinder switch valve 63 reaches the set pressure quickly. In this manner, the spool of the cylinder switch valve 63 is switched quickly from the first switch position 63a to the second switch position 63b, and thereby improving a switching speed of the HST motor 57 from the first speed to the second speed.

Third Embodiment

Figure 3:
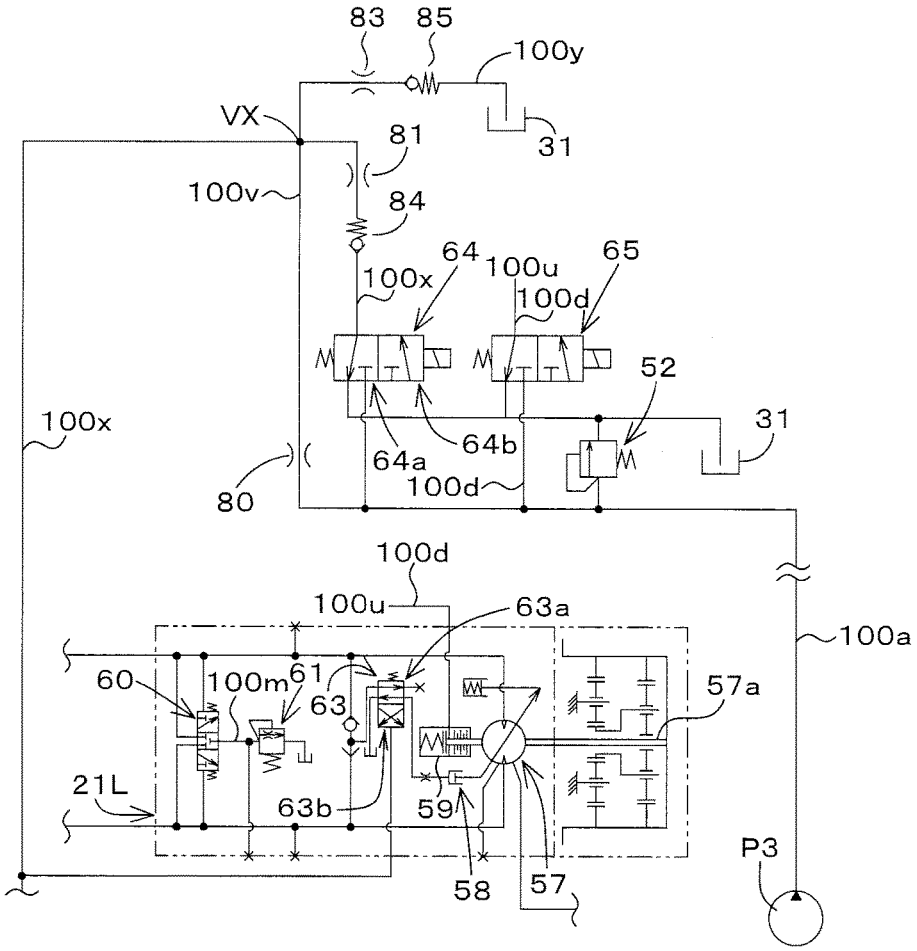
FIG. 3 is a view illustrating a hydraulic circuit of a hydraulic system according to a third embodiment of the present invention.

FIG. 3 illustrates a hydraulic system according to a third embodiment of the present invention. Explanations of components similar to the components of the above-mentioned embodiments will be omitted by being given reference numerals identical to the reference numerals of the above-mentioned embodiments. In the third embodiment, components different from the components of the above-mentioned embodiments will be explained mainly.

In the hydraulic system according to the third embodiment, a part of the pressure applying part is different from the configuration described in the second embodiment. In particular, a second check valve 85 is disposed on the third fluid tube 100y connecting the second speed switch valve 64 to the operation fluid tank 31, which is different from the second embodiment.

The second check valve 85 is disposed between the third throttle part 83 and the operation fluid tank 31. The second check valve 85 allows the pilot fluid to flow from the cylinder switch valve 63 to the operation fluid tank 31 when a pressure of the pilot fluid is equal to or more than a predetermined pressure, and blocks the pilot fluid flowing from the operation fluid tank 31 to the cylinder switch valve 63. Since the second check valve 85 is disposed as described above, the pilot fluid is not discharged from the cylinder switch valve 63 when a pressure of the pilot fluid in the third fluid tube 100y is less than a predetermined pressure, and thus a pressure in the second fluid tube 100x is maintained to be equal to or more than a predetermined pressure. It is preferable for the set pressure of the second check valve 85 to be set in the vicinity of a threshold value between a pressure required for the first speed and a pressure required for the second value.

In this manner, the pressure in the second fluid tube 100x is maintained to be equal to or more than a predetermined pressure even when a discharge pressure of the pilot fluid supplied from the third pump P3 is lowered by the changing of revolution speed of the engine 29, and thereby improving responsibility to the speed changing from the first speed to the second speed.

Fourth Embodiment

Figure 4:
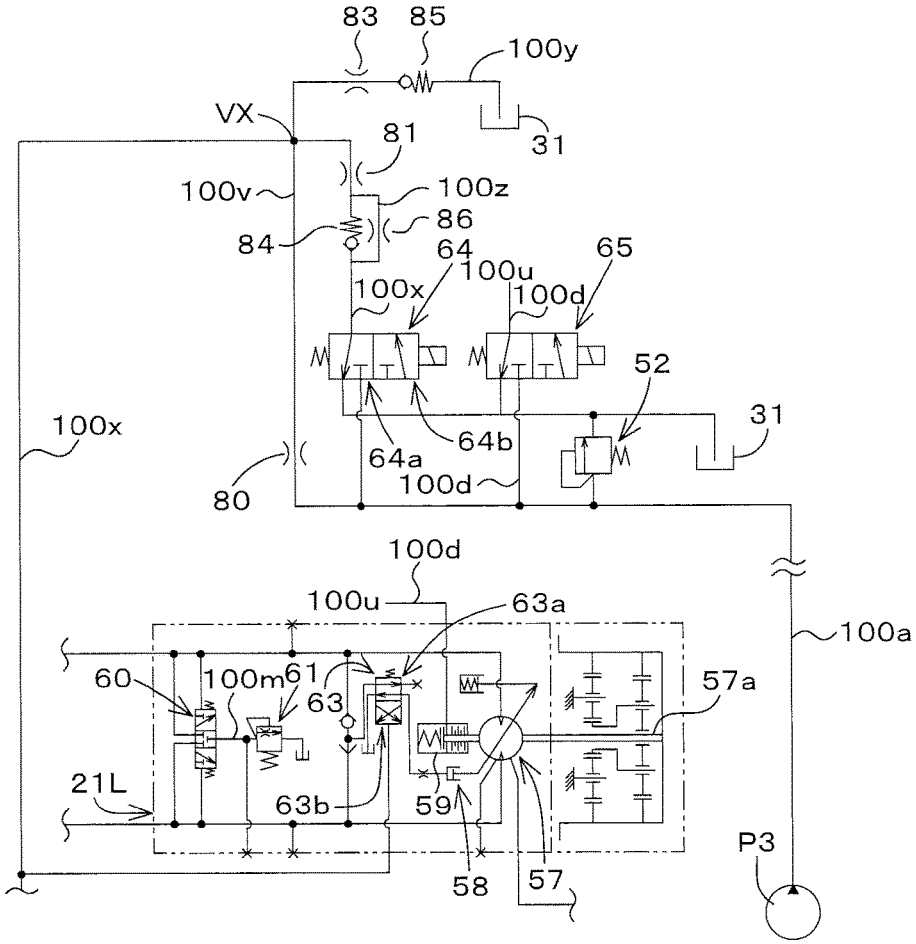
FIG. 4 is a view illustrating a hydraulic circuit of a hydraulic system according to a fourth embodiment of the present invention.

FIG. 4 illustrates a hydraulic system according to a fourth embodiment of the present invention. Explanations of components similar to the components of the above-mentioned embodiments will be omitted by being given reference numerals identical to the reference numerals of the above-mentioned embodiments. In the fourth embodiment, components different from the components of the above-mentioned embodiments will be explained mainly.

The hydraulic system according to the fourth embodiment includes a coupling part (a coupler) z. The coupling part z configured to an upper stream portion and a downstream portion of the first check valve 84 to the second fluid tube 100x. The coupling part z is constituted of a branched fluid tube connecting the upper stream portion of the first check valve 84 to the downstream portion of the first check valve 84. The branched fluid tube 100z is arranged in parallel with the first check valve 84. The coupling part may be configured by disposing a circular edge portion on a poppet of the first check valve 84, the circular edge portion having a track shape and defining a throttle hole.

The branched fluid tube 100z serves as a bypass circuit to supply the pilot fluid from the second fluid tube 100x to the cylinder switch valve 63 without being blocked by the first check valve 84, the pilot fluid flowing into the second fluid tube 100x through the second speed switch valve 64.

A fifth throttle part (a fifth throttle) 86 restricts an amount of the pilot fluid flowing in the branched fluid tube 100z and reduces the pressure (the pilot pressure) of the pilot fluid flowing in the branched fluid tube 100z.

A throttle diameter S1 of the first throttle part 80, a throttle diameter S2 of the second throttle part 81, a throttle diameter S3 of the third throttle part 83, and a throttle diameter S5 of the fifth throttle part 86 may be configured so as to satisfy a relationship, S2>S3>S1>S5, preferable. For example, the throttle diameter S1 is configured to be 0.7 mm dia., the throttle diameter S2 is configured to be 1.6 mm dia., the throttle diameter S3 is configured to be 1.4 mm dia., and the throttle diameter S5 is configured to be 0.5 mm dia.

In the hydraulic system according to the fourth embodiment, the branched fluid tube 100z and the fifth throttle part 86 are disposed on the second fluid tube 100x, and thus the pilot fluid in the cylinder switch valve 63 is discharged not only through the third fluid tube 100y and the third throttle part 83 but also through the branched fluid tube 100z and the fifth throttle part 86 in a case where the second speed switch valve 64 is switched to the first position 64a, that is, from the second speed to the first speed. In the hydraulic system according to the fourth embodiment, the second throttle part 81 disposed on the second fluid tube 100x may be omitted. In that case, the fifth throttle part 86 serves as the second throttle part 81.

Fifth Embodiment

Figure 5:
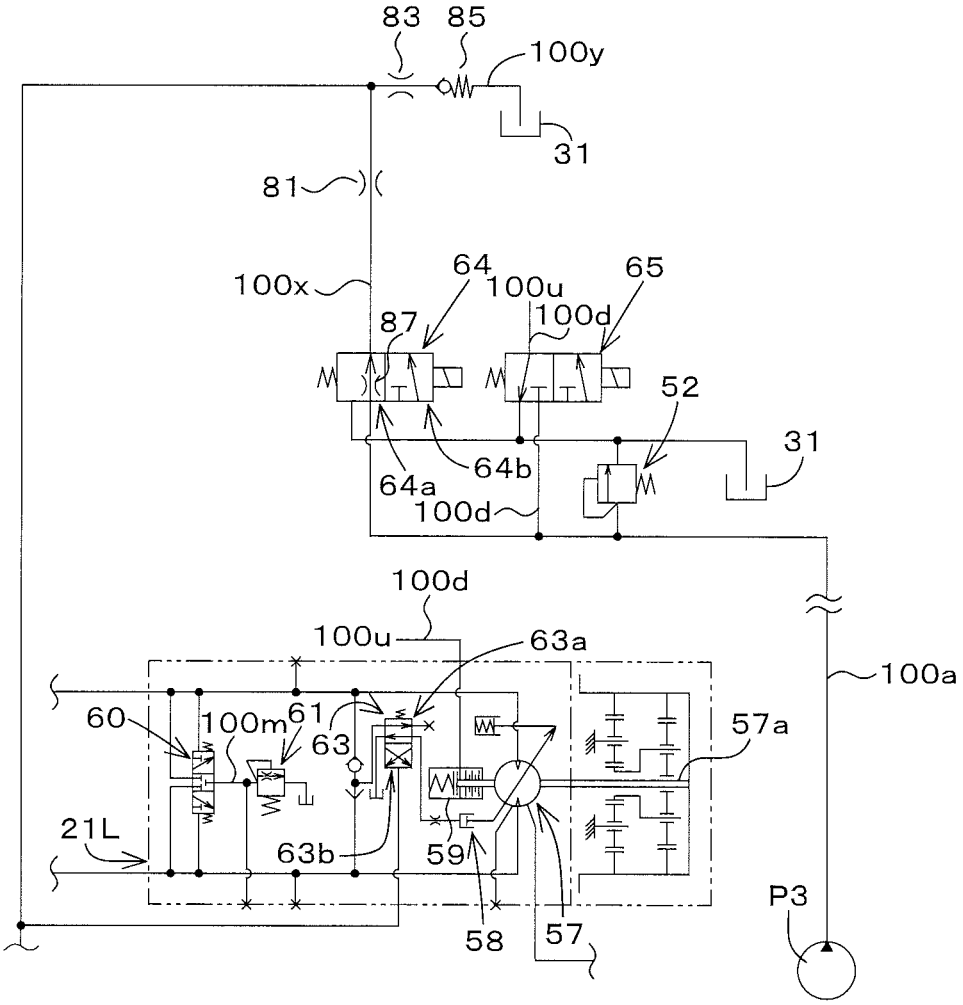
FIG. 5 is a view illustrating a hydraulic circuit of a hydraulic system according to a fifth embodiment of the present invention.

FIG. 5 illustrates a hydraulic system according to a fifth embodiment of the present invention. Explanations of components similar to the components of the above-mentioned embodiments will be omitted by being given reference numerals identical to the reference numerals of the above-mentioned embodiments. In the fifth embodiment, components different from the components of the above-mentioned embodiments will be explained mainly.

In the hydraulic system according to the fifth embodiment, the pressure applying part includes the second fluid tube 100x and a fourth throttle part (a fourth throttle) 87. The fourth throttle part 87 is a throttle valve disposed inside the second speed switch valve 64. The fourth throttle part 87 is disposed on the first position 64a of the second speed switch valve 64. A throttling amount of the fourth throttle part 87 is set such that a pressure of the pilot fluid flowing in the second speed switch valve 64 is set to be lower than the set pressure (the pilot pressure to move the spool of the cylinder switch valve 63 to the second switch position 63b) when the second speed switch valve 64 is switched to the first position 64a.

Thus, the discharge fluid tube 100a is connected to the cylinder switch valve 63 when the second speed switch valve 64 is switched to the first position 64a. At that time, the pressure of the pilot fluid flowing from the discharge fluid tube 100a to the cylinder switch valve 63 is lowered by the fourth throttle part 87. That is, a pressure lower than the set pressure (the pilot pressure to move the spool of the cylinder switch valve 63 to the second switch position 63b) is constantly applied to the cylinder switch valve 63. Thus, when the second speed switch valve 64 is switched to the second position 64b, the pilot pressure of the cylinder switch valve 63 reaches the set pressure quickly. In this manner, the spool of the cylinder switch valve 63 is switched quickly from the first switch position 63a to the second switch position 63b, and thereby improving the switching speed of the HST motor 57 from the first speed to the second speed.

According to the fifth embodiment, the pressure applying part includes the fourth throttle part 87 disposed inside the second speed switch valve 64. In this manner, the first fluid tube 100v and the first throttle part 80 can be omitted, and thereby simplifying the hydraulic circuit. In view of supplying the pressure, the second throttle part 81 may be omitted.

Sixth Embodiment

Figure 6:
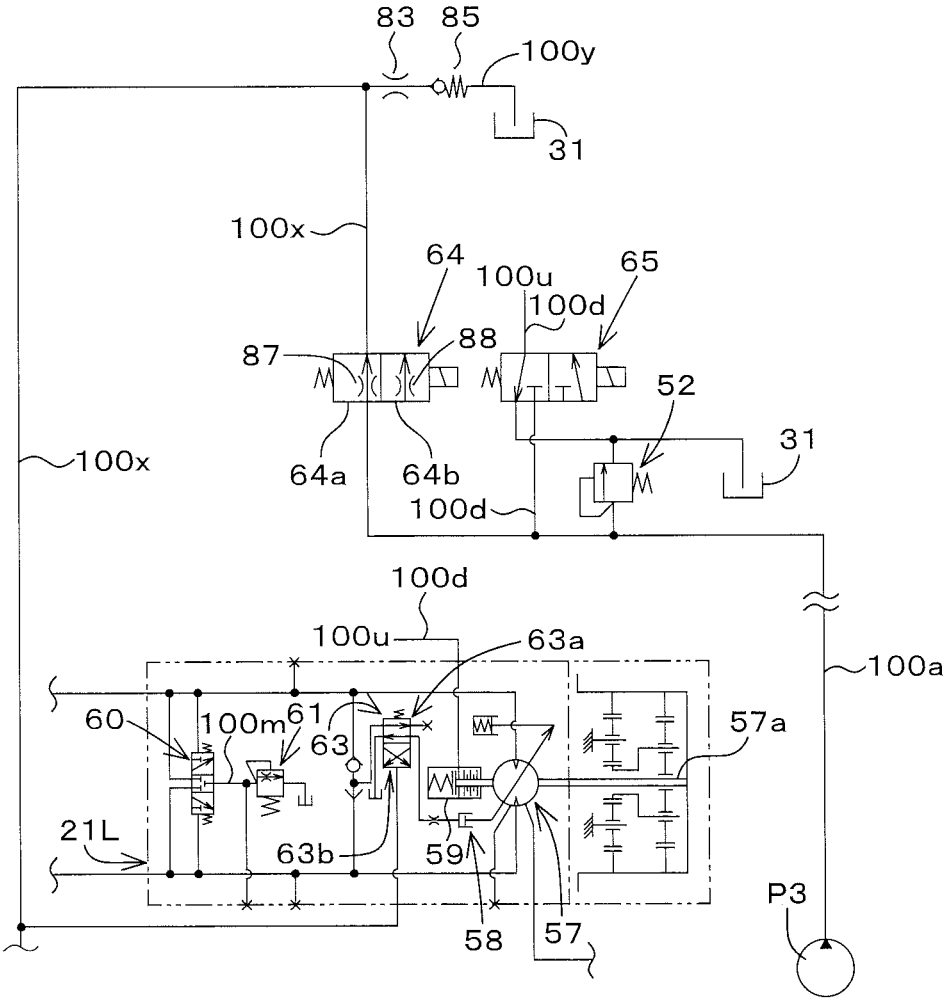
FIG. 6 is a view illustrating a hydraulic circuit of a hydraulic system according to a sixth embodiment of the present invention.

FIG. 6 illustrates a hydraulic system according to a sixth embodiment of the present invention. Explanations of components similar to the components of the above-mentioned embodiments will be omitted by being given reference numerals identical to the reference numerals of the above-mentioned embodiments. In the sixth embodiment, components different from the components of the above-mentioned embodiments will be explained mainly.

In the hydraulic system according to the sixth embodiment, the speed reducing part includes the second fluid tube 100x, the third fluid tube 100y, and a sixth throttle part (a sixth throttle) 88.

The sixth throttle 88 has a configuration different from the configuration of the fifth throttle part 87. The sixth throttle 88 is disposed on the second position 64b of the second speed switch valve 64. And, a throttle diameter S6 of the sixth throttle part 88 and the throttle diameter S4 of the fourth throttle part 87 are configured so as to satisfy a relationship, S6>S4. In this manner, the second speed switch valve 64 connects the discharge fluid tube 100a to the cylinder switch valve 63 by the sixth throttle valve 88 when the second speed switch valve 64 is switched to the second position 64b, and allows the pilot fluid to flow from the discharge fluid tube 100a of the pilot fluid to the cylinder switch valve 63, restricting the flow to have a predetermined flow rate. The flow rate allowed at that time is larger than the flow rate allowed when the second speed switch valve 64 is switched to the first position 64a because S6 is set to be larger than S4, S6>S4.

The sixth throttle part 88 restricts the flow rate of the pilot fluid flowing from the discharge fluid tube 100a of the pilot fluid to the cylinder switch valve 63, and thereby reducing the flow rate of the pilot fluid flowing in the second fluid tube 100x and reducing a pressure of the pilot fluid flowing in the second fluid tube 100x. That is, the sixth throttle part 88 provides a function similar to the function of the second throttle part 81. In this manner, the provision of the sixth throttle part 88 allows the second throttle part 81 to be omitted and allows the hydraulic circuit to be simplified.

Seventh Embodiment

Figure 7:
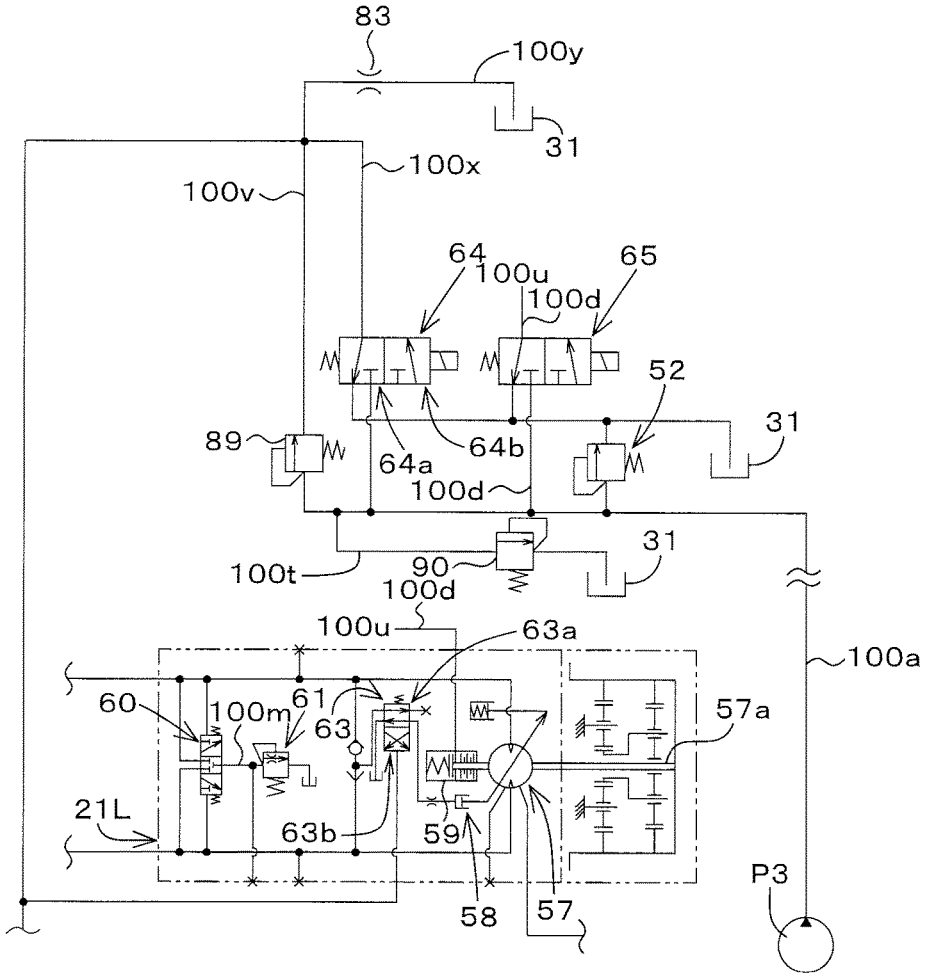
FIG. 7 is a view illustrating a hydraulic circuit of a hydraulic system according to a seventh embodiment of the present invention.

FIG. 7 illustrates a hydraulic system according to a seventh embodiment of the present invention. Explanations of components similar to the components of the above-mentioned embodiments will be omitted by being given reference numerals identical to the reference numerals of the above-mentioned embodiments. In the seventh embodiment, components different from the components of the above-mentioned embodiments will be explained mainly.

In the hydraulic system according to the seventh embodiment, the pressure applying part includes the first fluid tube 100v, a first relief valve 89, a fifth fluid tube 100t, a second relief valve 90, and a third throttle part (a third throttle) 83.

The first relief valve 89 is disposed on the first fluid tube 100v. The fifth fluid tube 100t is a fluid tube branching from an intermediate portion of the discharge fluid tube 100a and being connected to the operation fluid tank 31. The fifth fluid tube 100t may be a fluid tube connecting the operation fluid tank 31 to the first fluid tube 100v on an upper stream side (on a side close to the third pump P3) of the first relief valve 89.

The second relief valve 90 is disposed on the fifth fluid tube 100t. The set pressure of the second relief valve 90 is set to be higher than the set pressure of the first relief valve 89. For example, when the set pressure of the first relief valve 89 is a set pressure P5, the set pressure of the second relief valve 90 is a set pressure P6, and the set pressure of the third throttle part 83 is a set pressure P7, the set pressure P5 is configured to be 20 kg/cm$^2$, the set pressure P6 is configured to be 30 kg/cm$^2$, and the set pressure P7 is configured to be 5 kg/cm$^2$.

In a case where the discharge pressure of the third pump P3 is 25 to 30 kg/cm$^2$, a pressure of approximately 5 kg/cm$^2$ is applied to the cylinder switch valve 63 even when the second speed switch valve 64 is switched to the first position 64a. When the pilot pressure (the set pressure) to move the spool of the cylinder switch valve 63 to the second switch position 63b is configured to be 5 kg/cm$^2$, the spool of the cylinder switch valve 63 can be switched from the first switch position 63a to the second switch position 63b quickly.

The above-mentioned hydraulic systems according to the first to seventh embodiments include both of the pressure-applying part and the speed reducing part. In this manner, both of the improvement of responsibility and the absorbing (releasing) of shock can be achieved in the operation of changing the speed.

However, the hydraulic system according to the embodiments are not required to include both of the pressure applying part and the speed reducing part necessarily, and may include at least any one of the pressure applying part and the speed reducing part. Accordingly, the above-mentioned hydraulic systems according to the first to seventh embodiments may employ a configuration including any one of the pressure applying part and the speed reducing part.

FIG. 8 is a graph schematically illustrating an action of the hydraulic system (a change of hydraulic pressure in the speed changing) according to the embodiments.

In FIG. 8, the hydraulic system according to the embodiment is represented by a solid line, and a conventional hydraulic system is represented by a chain line.

Figure 8A:
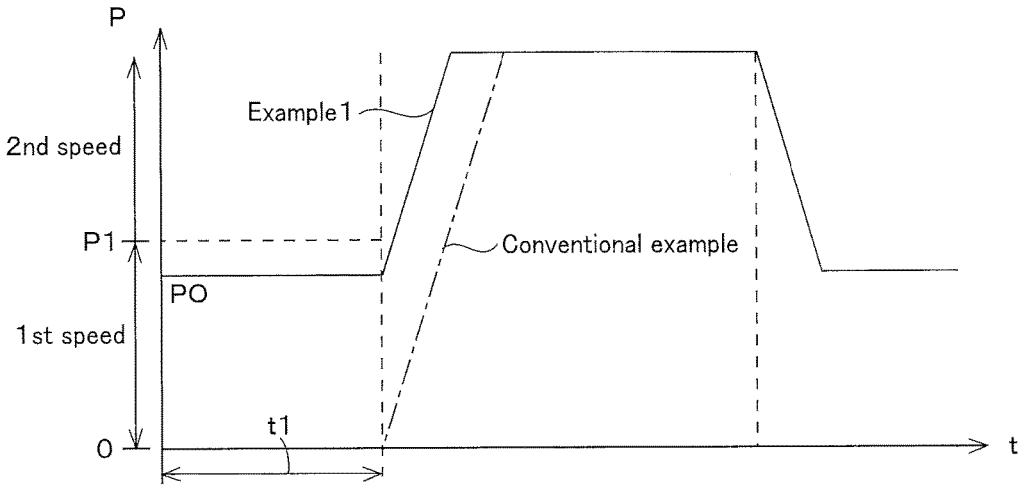
FIG. 8A is a view illustrating a change of hydraulic pressure in changing a speed in a case of employing only a pressure applying part (example 1)
Figure 8B:
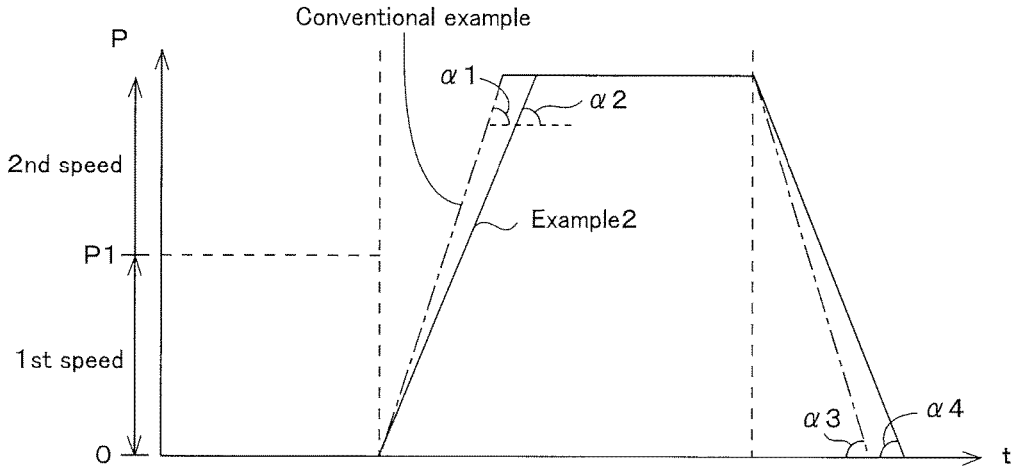
FIG. 8B is a view illustrating a change of hydraulic pressure in changing a speed in a case of employing only a speed reducing part (example 2)
Figure 8C:
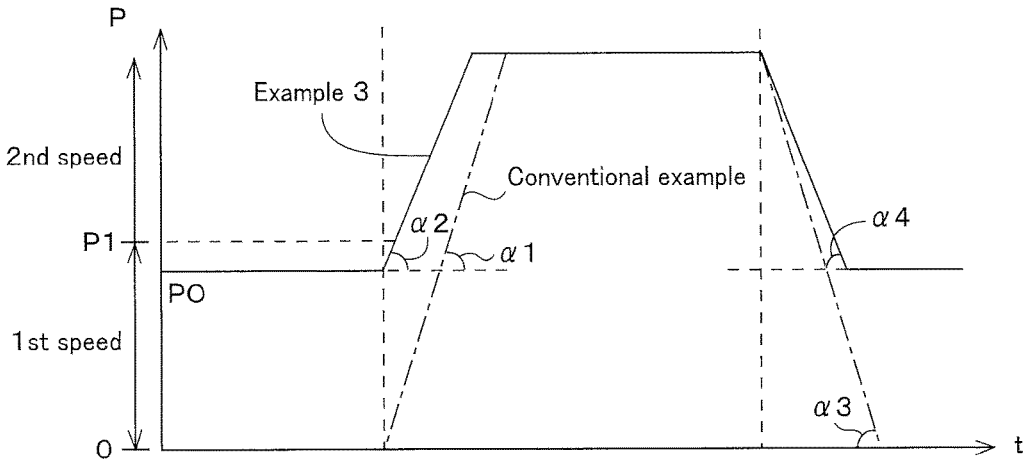
FIG. 8C is a view illustrating a change of hydraulic pressure in changing a speed in a case of employing both of the pressure applying part and the speed reducing part (example 3)

FIG. 8A illustrates a case (example 1) including the pressure applying part only, FIG. 8B illustrates a case (example 2) including the speed reducing part only, and FIG. 8C illustrates a case (example 3) including both of the pressure applying part and the speed reducing part. In FIG. 8A to FIG. 8C, the examples 1 to 3 are compared to a conventional hydraulic system (a conventional example) that does not include both of the pressure applying part and the speed reducing part.

As shown in FIG. 8A, in a case of the system (example 1) including the pressure applying part only, a predetermined pressure (the pilot pressure) is applied to the cylinder switch valve 63, the predetermined pressure being less than a pressure for switching to the second speed, in a period (t1) of the first speed before the changing from the first speed to the second speed. In this manner, the switching from the first speed to the second speed can be made quickly. The pilot pressure quickly reaches the set pressure P1 in comparison with the conventional example. That is, the responsibility of the changing from the first speed to the second speed is improved.

As shown in FIG. 8B, in a case of the system (example 2) including the speed reducing part only, the pilot pressure applied to the cylinder switch valve 63 is increased when the second speed switch valve 64 is switched to the second position 64b. However, a speed of increasing of the pilot pressure is reduced in comparison with the conventional example. That is, a slope $\alpha$1 is larger than a slope $\alpha$2 in FIG. 8B.

In addition, when a trigger for the switching to the second speed is turned off (the second speed switch valve 64 is switched to the first position 64a), the pilot pressure applied to the cylinder switch valve 63 is reduced. However, a speed of decreasing of the pilot pressure is reduced in comparison with the conventional example. That is, a slope α3 is larger than a slope α4 in FIG. 8B.

As described above, the speed of varying (increasing or decreasing) of the pilot pressure applied to the cylinder switch valve 63 is reduced, the changing of speed (from the first speed to the second speed or from the second speed to the first speed) is smooth, and thus a shock of the changing of speed is absorbed (released).

As shown in FIG. 8C, in a case of the system (example 3) including both of the pressure applying part and the speed reducing part, the pilot pressure increases gently and quickly reaches the set pressure P1 in comparison with the conventional example in the switching from the first speed to the second speed. Both of the improvement of responsibility and the absorbing (releasing) of shock can be achieved in the switching from the first speed to the second speed.

The embodiment mentioned above describes an example employing the HST motor 57 as a hydraulic motor capable of changing the speed, the HST motor 57 being constituted of a variable displacement axial pump employing a swash plate, the variable displacement axial pump being configured to change the speed to two speeds, high and low. However, a type of the hydraulic motor is not limited to that motor. For example, the HST motor 57 employs a cam motor instead of the variable displacement axial pump employing a swash plate, the cam motor being configured to change a speed by being switched between a low-speed high-torque (large displacement) mode and a high-speed low-torque (small displacement) mode.

In addition, the hydraulic systems according to the embodiments can be applied not only to the hydraulic circuits configuring the speed-changing device described in the above-mentioned examples but also to other types of the hydraulic circuits.

Figure 9:
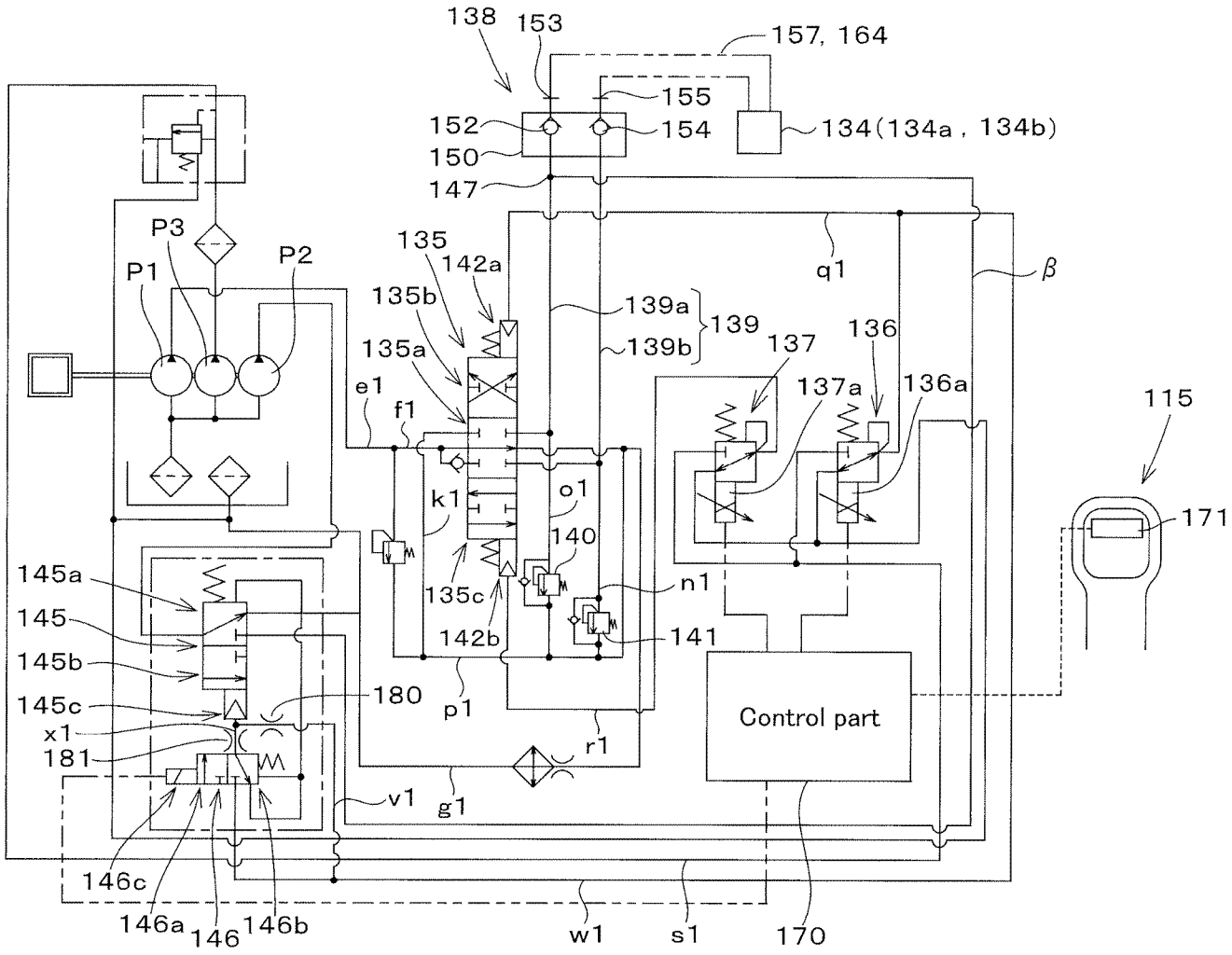
FIG. 9 is a view illustrating a hydraulic circuit of a hydraulic system according to an eighth embodiment of the present invention.
Figure 10:
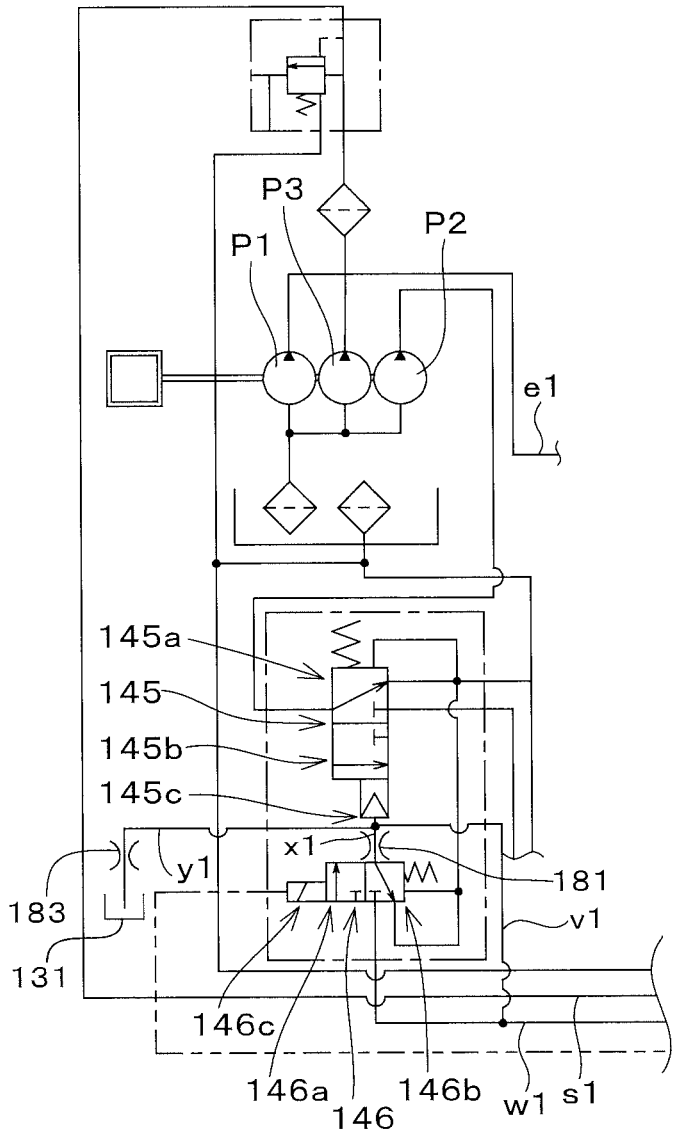
FIG. 10 is a view illustrating a hydraulic circuit according to a first modified example of the eighth embodiment.
Figure 11:
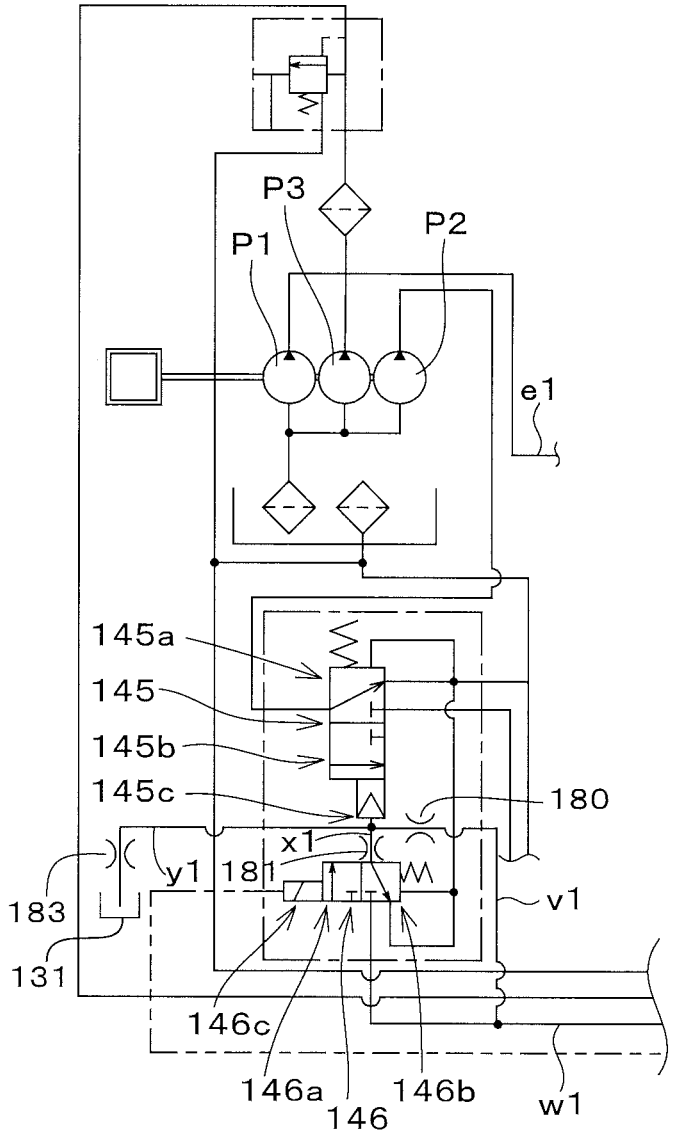
FIG. 11 is a view illustrating a hydraulic circuit according to a second modified example of the eighth embodiment.

Referring to FIG. 9 to FIG. 11, a hydraulic system according to an eighth embodiment of the present invention and a modified example of the eighth embodiment will be explained.

Eighth Embodiment

FIG. 9 illustrates a hydraulic system according to an eighth embodiment of the present invention. The hydraulic system according to the eighth embodiment is disposed on the work machine 1 illustrated in FIG. 20 as with the hydraulic systems according to the above-mentioned embodiments (the first to seventh embodiments).

The hydraulic system according to the eighth embodiment includes the first pump P1, an auxiliary control valve 135 (*which may be referred to simply as "a control valve"*), and a pair of auxiliary operation valves 136 and 137 (*which may be referred to simply as "operation valves"*).

The auxiliary control valve 135 is constituted of a three-position switch valve of a direct-acting spool type using the pilot fluid. The auxiliary control valve 135 is configured to be switched to a neutral position 135a, to a first position 135b, and to a second position 135c by the pilot pressure. The auxiliary control valve 135 is configured to be returned to the neutral position 135a by a spring.

A supply fluid tube (a supply fluid path) f1 is connected to the auxiliary control valve 135, the supply fluid tube f1 communicating with a discharge tube (a discharge path) e1 of the first pump P1. In addition, a bypass fluid tube (a bypass fluid path) p1 is connected to the auxiliary control valve 135 by a discharge fluid tube (a discharge fluid path) k1, and a drain fluid tube (a drain fluid path) g1 is connected to the auxiliary control valve 135, the drain fluid tube g1 returning to the tank side. A first supply tube 139 (*which may be referred to simply as "a supply tube"*) is connected to a portion between the auxiliary control valve 135 and a connection device 138 configured to connect the hydraulic actuator 134. The first supply tube 139 is constituted of two fluid tubes (two fluid paths). One of the fluid tubes, a fluid tube 139a, is connected to the bypass fluid tube p1 by a first relief tube (a first relief path) o1. The other one of the fluid tubes, a fluid tube 139b, is connected to the bypass fluid tube p1 by a second relief tube (a second relief path) n1. A relief valve 140 is disposed on the first relief tube n1, and a relief valve 141 is disposed on the second relief tube o1.

The auxiliary operation valve 136 is connected to a pressure receiving part (a pressure receiver *or a first pressure receiver*) 142a by the first pilot fluid tube q1, the pressure receiving part 142a being disposed on one side of the auxiliary control valve 135. The auxiliary operation valve 137 is connected to a pressure receiving part (a pressure receiver) 142b by the second pilot fluid tube r1, the pressure receiving part 142b being disposed on the other side of the auxiliary control valve 135. A pressured fluid (the pilot fluid) can be supplied to the pair of auxiliary operation valves 136 and 137 through a pilot pressure supply fluid tube [s] *s1*. In this manner, when the auxiliary control valve 135 is switched to the first position 135b by the auxiliary operation valves 136 and 137, an operation fluid from the first pump P1 is supplied from the fluid tube 139a to the hydraulic actuator 134, and an operation fluid returning from the hydraulic actuator 134 flows from the fluid tube 139b to the discharge fluid tube k1.

In addition, when the auxiliary control valve 135 is switched to the second position 135c by the auxiliary operation valves 136 and 137, an operation fluid from the first pump P1 is supplied from the fluid tube 139b to the hydraulic actuator 134, and an operation fluid returning from the hydraulic actuator 134 flows from the fluid tube 139a to the discharge fluid tube k1. As described above, the operation fluid from the first pump P1 can be supplied to the hydraulic actuator 134 of each of the attachments attached instead of the bucket.

The hydraulic system includes the second pump P2, the high flow valve 145, and a high flow *switch* valve 146 (*which may be referred to simply as "a switch valve"*) configured to operate the high flow valve 145.

The high flow valve 145 is a hydraulic switch valve constituted of a two-position switch valve using the pilot pressure. The high flow valve (the hydraulic switch valve) 145 is configured to be switched to two switch positions (a non-increasing position 145a and an increasing position 145b) by the pilot pressure. The high flow valve 145 is connected to a fluid tube (a fluid path) disposed on a discharge side of the second pump P2. The high flow valve 145 is connected to a second operation fluid supply tube (an increasing fluid tube) β, the second operation fluid supply tube (an increasing fluid tube) β being connected to the fluid tube 139a of the first supply tube 139. In addition, the high flow valve 145 is connected to the drain fluid tube g1 returning to the tank side.

The high flow switch valve 146 is connected to a pressure receiving part (a pressure receiver *or a second pressure receiver*) 145c of the high flow valve 145. The high flow switch valve 146 is a direction switch valve constituted of an electromagnetic two position switch valve, the electromagnetic two position switch valve being configured to be switched to an applying position (a second position) 146a and to a non-applying position (a first position) 146b. The applying position 146a allows the pilot pressure (*which may be referred to as the "second pilot pressure"*) to be applied to the pressure receiving part 145c. The non-applying position 146b allow the pilot pressure not to be applied to the pressure receiving part 145c. The high flow switch valve (the direction switch valve) 146 is connected to one end portion of an interlocking fluid tube (an interlocking fluid path) w1 communicating with the first pilot fluid tube q1.

In this manner, when the high flow switch valve 146 is switched to the applying position 146a, a pressure (the pilot pressure) of the pilot fluid discharged from the [third] *second* pump [P3] *P2* is applied to the pressure receiving part 145c of the high flow valve 145, and thus the high flow valve 145 is switched to the increasing position 145b. As the result, the operation fluid discharged from the second pump P2 flows into the increasing fluid tube β, the operation fluid in the increasing fluid tube β is joined with the fluid tube 139a of the first supply tube 139 at a confluence part 147, and then the operation fluid is increased from the confluence part 147 to the connection device 138.

In addition, when the high flow *switch* valve 146 is switched to the non-applying position 146b allowing the pilot pressure not to be applied to the pressure receiving part 145c, the pilot pressure being a pressure required to move the spool of the high flow valve 145, the pilot pressure equal to or more than the set pressure is not applied to the pressure receiving part 145c of the high flow valve 145, and then the high flow valve 145 is switched to the non-applying position 145a (switched to the non-increasing mode). Even when the high flow switch valve 146 is switched to the non-applying position 146b by an action of the pressure applying part described below, the pilot pressure less than the set pressure is applied to the pressure receiving part 145c of the high flow valve 145. Configurations and actions of the pressure applying part will be described later in detail.

When the high flow valve 145 is switched to the non-increasing position 145a, the discharge fluid from the second pump P2 does not flow into the increasing fluid tube β, and only the operation fluid from the first pump P1 flows from the confluence part 147 to the connection device 138. In this manner, the operation fluid from the second pump can be added to the operation fluid from the first pump.

The connection device 138 is configured to be connected to a large capacity hydraulic actuator (also referred to as a hydraulic actuator with a large capacity configuration) 134a requiring the increasing from an increasing fluid tube β and to a standard capacity hydraulic actuator (also referred to as a hydraulic actuator with a standard capacity configuration) 134b not requiring the increasing from an increasing fluid tube β. For convenience of explanation, both of the large capacity hydraulic actuator 134a and the standard capacity hydraulic actuator 134b are connected to the connection device 138 in FIG. 9. However, any one of the large capacity hydraulic actuator 134a and the standard capacity hydraulic actuator 134b is connected to the connection device 138 actually.

The connection device 138 includes a connection part 150 connected to the fluid tube 139a and to the fluid tube 139b. A check valve 152 is disposed on a portion connected to the fluid tube 139a in the connection part 150, and a check valve 154 is disposed on a portion connected to the fluid tube 139b in the connection part 150. A connection port 153 is provided on the check valve 152, and a connection port 155 is provided on the check valve 154.

In a case where an attachment including the large capacity hydraulic actuator 134a (for example, a brush cutter, a forest mower, and the like) is connected to the connection device 138, one of the hydraulic hoses that is a hydraulic hose 157 is connected to the connection port 153, and the other one of the hydraulic hoses that is a hydraulic hose 158 is connected to the connection port 155.

Also on a case where an attachment including the standard capacity hydraulic actuator 134b (for example, a hydraulic breaker, a tilt bucket, and the like) is connected to the connection device 138, one of the hydraulic hoses that is a hydraulic hose 164 is connected to the connection port 153, and the other one of the hydraulic hoses that is a hydraulic hose 165 is connected to the connection port 155.

The work machine 1 includes a control part (a controller) 170. The control part 170 controls operations of the auxiliary operation valves 136 and 137 (an operation of the auxiliary control valve 135) and an operation of the high flow switch valve 146 (an operation of the high flow valve 145) in accordance with an operation amount of a slide button 171 disposed on an operation fluid operation device [15] *115* (*which may be referred to simply as "an operation device"*).

When the slide button (an operation means) 171 is slid to one side, an operation signal corresponding to an operation amount of the slide button 171 is inputted to the control part 170, thus the control part 170 outputs a command signal corresponding to the operation amount of the slide button 171 to the auxiliary operation valve 136, and then a solenoid 136a of the auxiliary operation valve 136 is magnetized. In this manner, the auxiliary operation valve 136 outputs the pilot pressure proportional to the operation amount of the slide button 171, the pilot pressure is applied to the pressure receiving part 142a of the auxiliary control valve 135 through the first pilot fluid tube q1, and thus the auxiliary control valve 135 is operated to the first position 135b in proportion to the operation amount of the slide button 171.

In addition, when the slide button 171 is slid to the other side, an operation signal corresponding to an operation amount of the slide button 171 is inputted to the control part 170, thus the control part 170 outputs a command signal corresponding to the operation amount of the slide button 171 to the auxiliary operation valve 137, and then a solenoid 137a of the auxiliary operation valve 137 is magnetized. In this manner, the auxiliary operation valve 137 outputs the pilot pressure proportional to the operation amount of the slide button 171, the pilot pressure is applied to the pressure receiving part 142b of the auxiliary control valve 135 through the second pilot fluid tube r1, and thus the auxiliary control valve 135 is operated to the second position 135c in proportion to the operation amount of the slide button 171.

When the slide button 171 is slid to the maximum extent, a solenoid 146c of the high flow switch valve 146 is continuously magnetized, the high flow switch valve 146 is switched to the applying position 146a, and thus an amount of the operation fluid is increased (switched to the increasing mode). That is, when the slide button 171 is slid to the maximum extent, the operation fluid from the high flow valve 145 flows from the sub pump P3 into the first operation fluid supply tube 139a through the increasing fluid tube β, and thus the amount of the operation fluid can be increased.

In the hydraulic system according to the eighth embodiment, the pressure applying part includes a first fluid tube (a first fluid path) v1 and a first throttle 180 disposed on the first fluid tube v1.

The first fluid tube v1 connects an intermediate portion of the interlocking fluid tube w1 to a second fluid tube (a second fluid path) x1, the second fluid tube x1 connecting the high flow switch valve (the direction switch valve) 146 to the high flow valve (the hydraulic switch valve) 145. The interlocking fluid tube w1 is connected to the third pump P3 through the auxiliary operation valve 136 and the pilot pressure supply fluid tube [s] *s1*. Thus, the first fluid tube v1 connects the third pump P3 to the high flow valve 145.

In this manner, the pilot fluid discharged from the third pump P3 and flowing in the interlocking fluid tube w1 flows into the high flow valve 145 without passing through the high flow switch valve 146.

The first throttle part 180 sets a pressure (the pilot pressure) of the pilot fluid flowing in the first fluid tube v1 to be lower than the pilot pressure (the set pressure) that moves the spool of the high flow valve 145 to the increasing position 145b. In this manner, the high flow valve 145 constantly receives a pressure lower than the pilot pressure (the set pressure) that moves the spool of the high flow valve 145 to the increasing position 145b.

Provision of the pressure applying part applies a pre-pressure less than the set pressure to the high flow valve 145 through the first fluid tube v1 and the first throttle part 180 even when the high flow switch valve (the direction switch valve) 146 is at the non-applying position 146b. Thus, when the high flow switch valve 146 is switched to the applying position 146a, the pilot pressure in the high flow valve 145 reaches the set pressure quickly. In this manner, the spool of the high flow valve 145 is switched from the non-increasing position 145a to the increasing position 145b quickly, and thereby improving a speed of switching to the increasing mode for increasing an amount of the operation fluid flowing to the hydraulic actuator.

In the hydraulic system according to the eighth embodiment, the speed reducing part includes the second fluid tube x1 and a second throttle part (a second throttle) 181 disposed on the second fluid tube x1, the second fluid tube x1 connecting the high flow switch valve 146 to the high flow valve 145.

The second throttle part 181 restricts an amount of the pilot fluid flowing in the second fluid tube x1 and reduces the pressure (the pilot pressure) of the pilot fluid flowing in the second fluid tube x1. In this manner, the second throttle part 181 reduces the speed of varying of the pilot pressure applied to the high flow valve 145 and thereby reduces a speed of moving of the spool of the high flow valve 145. As the result, the switching to the increasing mode (starting-up of the high flow) is smooth, the increasing mode being provided for increasing an amount of the operation fluid flowing into the hydraulic actuator, and thus a shock of the switching of mode is absorbed (released).

FIG. 10 illustrates a first modified example of the speed reducing part. FIG. 11 illustrates a second modified example of the speed reducing part. The modified examples will be explained.

In the first modified example illustrated in FIG. 10, the speed reducing part includes the second fluid tube x1, the second throttle part 181, the third throttle part 183, and a third fluid tube y1. The second fluid tube x1 and the second throttle part 181 have configuration similar to the configurations illustrated in FIG. 9 according to the eighth embodiment. The third fluid tube y1 is a fluid tube branched from between the second throttle part 181 and the high flow valve 145 and connected to a fluid tank 131. The third throttle part 183 is a throttle disposed on the third fluid tube y1.

In the first modified example, an amount (a flow-in amount) of the pilot fluid flowing into the high flow valve 145 through the second throttle part 181 of the second fluid tube x1 is increased to be larger than an amount (a discharge amount) of the pilot fluid discharged from the high flow valve 145 through the third throttle part 183 of the third fluid tube y1. In this manner, the pilot pressure applied to the high flow valve 145 is increased, and thereby the spool of the high flow valve 145 is switched to the increasing position 145b. In that case, throttling amounts of the second throttle part 181 and the third throttle part 183 are balanced appropriately, and a balance between the flow-in amount and the discharge amount is optimized. Thus, the speed of varying (increasing) of the pilot pressure applied to the high flow valve 145 can be reduced. The above-mentioned configuration absorbs (releases) a shock of the changing to the increasing mode.

On the other hand, in the switching to the non-increasing mode, the pilot fluid is discharged from the high flow valve 145 through the third throttle part 183 of the third fluid tube y1. The discharging of the pilot fluid from the third fluid tube y1 reduces the pilot pressure applied to the high flow valve 145, and thus the spool of the high flow valve 45 is switched to the non-increasing position 145a. In that case, the third throttle valve 183 is disposed on the third fluid tube y1, and thus the speed of varying (decreasing) of the pilot pressure applied to the high flow valve 145 can be reduced. The above-mentioned configuration absorbs (releases) a shock of the changing.

In the second modified example illustrated in FIG. 11, the speed reducing part includes the second fluid tube x1, the first throttle part 180, the second throttle part 181, the third throttle part 183, and the third fluid tube y1 The second fluid tube x1, the second throttle part 181, the third throttle part 183, and the third fluid tube y1 have configuration similar to the configurations according to the first modified example of the eighth embodiment. The first throttle part 180 is disposed on a fluid tube branched from between the second throttle part 181 and the high flow valve 145 and connected to the second pilot fluid tube r1.

In the second modified example, the hydraulic system according to the second modified example is capable of controlling the throttling amount of the first throttle part 180 and the throttling amount of the third throttle part 183, and thereby controlling an amount (a supply amount) of the pilot fluid supplied to the high flow valve 145 through the first fluid tube v1 and an amount (a discharge amount) of the pilot fluid discharged from the high flow valve 145 to the operation fluid tank 131 through the third fluid tube y1. In this manner, the throttling amount of the first throttle part 180 and the throttling amount of the third throttle part 183 are balanced appropriately, and a balance between the flow-in amount and the discharge amount is optimized. Thus, a pressure lower than the pilot pressure (the set pressure) to move the spool of the high flow valve 145 to the increasing position 145b is constantly applied to the high flow valve 145.

For one example, an example employing a hydraulic switch valve having a spool as the hydraulic switch valve (the cylinder switch valve 63 and the high flow valve 145) is described in the above-mentioned embodiments, the spool being configured to move to two switch positions (the second switch position 63a and the second switch position 63b, the non-increasing position 145a and the increasing position 145b) depending on the pilot pressure. However, the hydraulic switch valve may have a spool configured to move to three or more switch positions depending on the pilot pressure, and may be employed in the hydraulic system according to the above-mentioned embodiments. In particular, a hydraulic switch valve having a neutral position between the second switch position 63a and the second switch position 63b or between the non-increasing position 145a and the increasing position 145b may be employed as the hydraulic switch valve (the cylinder switch valve 63, the high flow valve 145).

Ninth Embodiment

Figure 12:
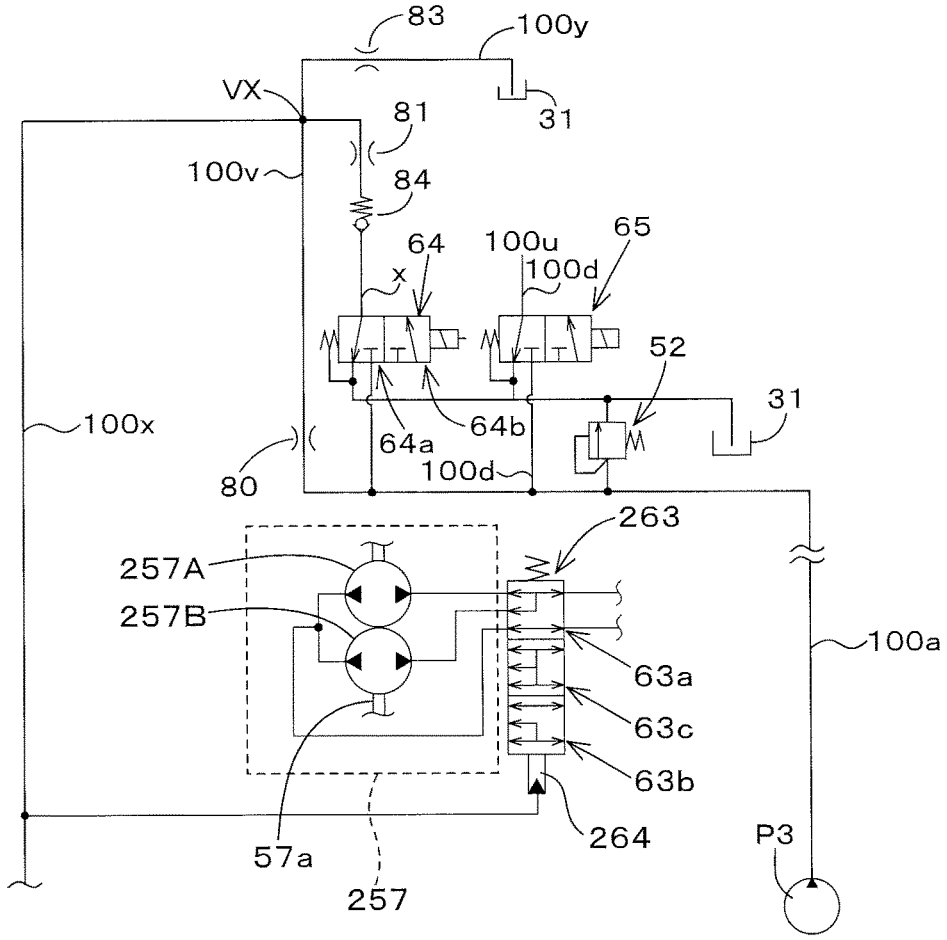
FIG. 12 is a view illustrating a hydraulic circuit of a hydraulic system according to a ninth embodiment of the present invention.

FIG. 12 illustrates a hydraulic system according to a ninth embodiment of the present invention. The ninth embodiment is a modified example employing a modified HST motor (a hydraulic motor for traveling) and a modified hydraulic switch valve. The HST motor (the hydraulic motor for traveling) and the hydraulic switch valve according to the ninth embodiment can be applied to all of the embodiments described above. That is, the HST motor and the hydraulic switch valve according to the embodiments described above may be replaced by the HST motor and the hydraulic switch valve according to the ninth embodiment. In the ninth embodiment, explanations of configurations similar to the configurations according to the embodiments described above will be omitted.

As shown in FIG. 12, a cam motor (a radial piston motor) is employed as the HST motor 257 in the ninth embodiment. The HST motor 257 varies a displacement (a motor capacity) in operation, and thereby changes the torque and the revolution speed of an output shaft.

In particular, the HST motor 257 includes a first motor 257A and a second motor 257B. When the operation fluid is supplied to both of the first motor 257A and the second motor 257B, the motor capacity is increased, and thus the HST motor 257 is in the first speed. In addition, when the operation fluid is supplied to either one of the first motor 257A and the second motor 257B, the motor capacity is decreased, and thus the HST motor 257 is in second first speed.

The hydraulic switch valve 263 is a valve configured to switch the HST motor 257 to the first speed and to the second speed, and is capable of being switched to the first switch position 63a, to the second switch position 63b, and to the neutral position 63c. In particular, when a pressure of the pilot fluid applied to a pressure receiving part (a pressure receiver) 264 of the hydraulic switch valve 263 is less than the set value, the hydraulic switch valve 263 is at the first switch position 63a. When the hydraulic switch valve 263 is at the first switch position 63a, the operation fluid is supplied to both of the first motor 257A and the second motor 257B, and thus the HST motor 257 is in the first speed. When the pressure of the pilot fluid applied to the pressure receiving part 264 of the hydraulic switch valve 263 is equal to or more than the set value, the hydraulic switch valve 263 is switched to the second switch position 63b through the neutral position 63c. When the hydraulic switch valve 263 is at the second switch position 63b, the operation fluid is supplied to the first motor 257A, and thus the HST motor 257 is in the second speed.

The hydraulic switch valve 263 mentioned above is connected to the second speed switch valve (the direction switch valve) 64 by the second fluid tube 100x. The first throttle part 80 is disposed on the first fluid tube 100v, and the second throttle part 81 is disposed between the confluence part VX and the second speed switch valve 64.

The pilot fluid discharged from the third pump P3 can be applied to the pressure receiving part 264 of the hydraulic switch valve 263 through the first throttle 80. When the second speed switch valve 64 is switched to the second position 64b under a state where a pre-pressure less than the set pressure is applied to the pressure receiving part 264, the pilot pressure in the hydraulic switch valve 263 reaches the set pressure quickly. That is, the hydraulic switch valve 263 can be switched from the first switch position 63a to the second switch position 63b through the neutral position 63c quickly, and thereby improving a speed of switching the HST motor 257 from the first speed to the second speed.

The second throttle part 81 restricts an amount of the pilot fluid flowing in the second fluid tube 100x and reduces the pressure (the pilot pressure) of the pilot fluid flowing from the second speed switch valve 64 to the hydraulic switch valve 263. In this manner, the second throttle part 81 reduces the speed of varying of the pilot pressure applied to the hydraulic switch cylinder 263 and thereby reduces a speed of switching of the hydraulic switch valve 263. As the result, that configuration reduces a shock caused by the switching of the HST motor 57 from the first speed to the second speed.

Tenth Embodiment

Figure 13:
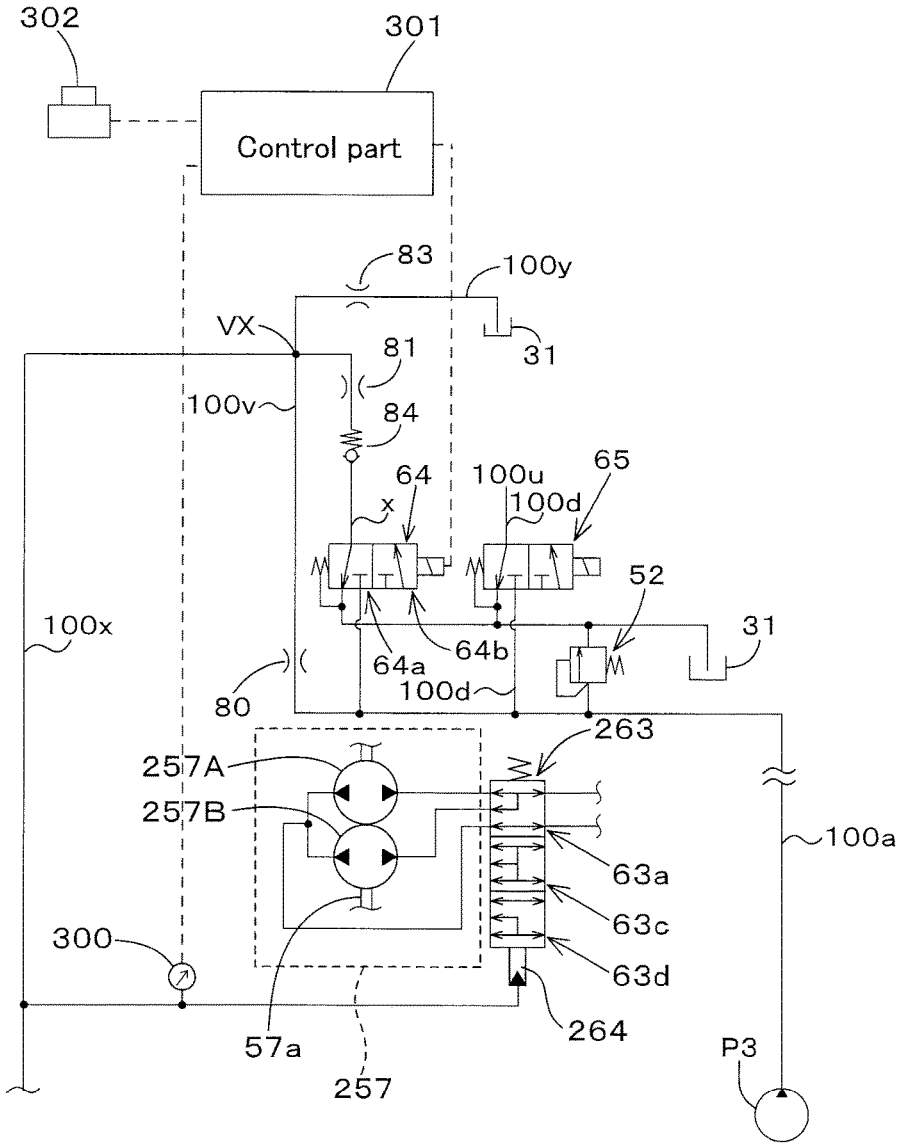
FIG. 13 is a view illustrating a hydraulic circuit of a hydraulic system according to a tenth embodiment of the present invention.

FIG. 13 illustrates a hydraulic system according to a tenth embodiment of the present invention. As shown in FIG. 13, the second speed switch valve (the direction switch valve) 64 is controlled based on the pilot pressure in the second fluid tube 100x in the tenth embodiment. In the tenth embodiment, explanations of configurations similar to the configurations according to the embodiments described above will be omitted.

As shown in FIG. 13, a pressure detection part (a pressure sensor) 300 is disposed on the second fluid tube 100x between the confluence part VX and the pressure receiving part 264 of the hydraulic switch valve 263, the pressure detection part 300 being configured to detect the pilot pressure. The pressure detection part 300 is constituted of a pressure gauge (a pressure sensor). The pressure detection part 300 is connected to a control part (a controller) 301. The control part 301 is constituted of a CPU and the like.

The control part 301 controls the second switch valve 64 on the basis of an operation member 302 and the pilot pressure detected by the pressure detection part 300, the operation member 302 being connected to the control part 301. The operation member 302 is a switch configured to operate the switching of the speed, that is, to set the first speed and the second speed. The operation member 302 is constituted of a seesaw switch configured to be swung, a slide switch configured to be slid, and a push switch configured to be pushed. The seesaw switch is capable of being swung to one side to set the first speed and swung to the other side to set the second speed. The slide switch is capable of being slid to one side to set the first speed and slid to the other side to set the second speed. The slide switch is capable of setting the first speed and the second speed alternately every time when pushed.

The control by the control part 301 will be explained next.

In a case where the pilot pressure detected by the pressure detection part 300 is less than a set value (the set pressure) and the operation member 302 is operated to set the first speed, the control part 301 outputs a command (referred to as a first speed command) to the direction switch valve 64, the command being outputted to switch the direction switch valve 64 to the first position 64a.

In a case where the pilot pressure detected by the pressure detection part 300 is equal to or more than the set value (the set pressure) and the operation member 302 is operated to set the second speed, the control part 301 outputs a command (referred to as a second speed command) to the direction switch valve 64, the command being outputted to switch the direction switch valve 64 to the second position 64b.

When the pilot pressure detected by the pressure detection part 300 is less than a predetermined pressure (the set value) under the state where the command to switch the direction switch valve 64 to the second position is outputted (the state where the second speed command is outputted), the first speed command is outputted to the direction switch valve 64.

For example, the pilot pressure in the second fluid tube 100x is raised to be equal to or more than the set pressure after the outputting of the second speed, and then the pilot pressure in the second fluid tube 100x is decreased to be less than the set pressure. In that case, the control part 301 outputs the first speed command to the direction switch valve 64. In addition, the pilot pressure in the second fluid tube 100x is not raised to the set pressure or more after the outputting of the second speed and stays less than the set pressure, for example. In that case, the control part 301 outputs the first speed command to the direction switch valve 64.

That is, the control part 301 monitors the pilot pressure in the second fluid tube 100x after the outputting of the second speed. When the pilot pressure in the second fluid tube 100x is equal to or more than the set value, it can be believed that the hydraulic switch valve 263 is at the second switch position 63b in accordance with the second speed command and thus the HST motor 257 is at the second speed. However, when the pilot pressure in the second fluid tube 100x is less than the set value, the hydraulic switch valve 263 may be not at the second switch position 63b but at the neutral position 63c regardless of the second speed command outputted by the control part 301. For that reason, when the pilot pressure in the second fluid tube 100x is less than the set value, the control part 301 stops outputting the second speed command and outputs the first speed command after outputting the second speed command to the direction switch valve 64.

Accordingly, when the pilot pressure in the second fluid tube 100x is lowered by some condition under the state where the control part 301 outputs the second speed command, the control part 301 outputs the first speed command to the direction switch valve 64 and thereby prevents the hydraulic switch valve 263 from being maintained at the neutral position 63c. For example, the hydraulic switch valve 263 can be prevented from being undesirably switched to the neutral position 63c in a case where the pilot pressure in the second fluid tube 100x is decreased temporarily due to an engine revolution speed being decreased rapidly, a hitch cylinder being operated rapidly, the operation fluid being heated extremely, and the like under the state where the control part 301 outputs the second speed command.

Figure 18:
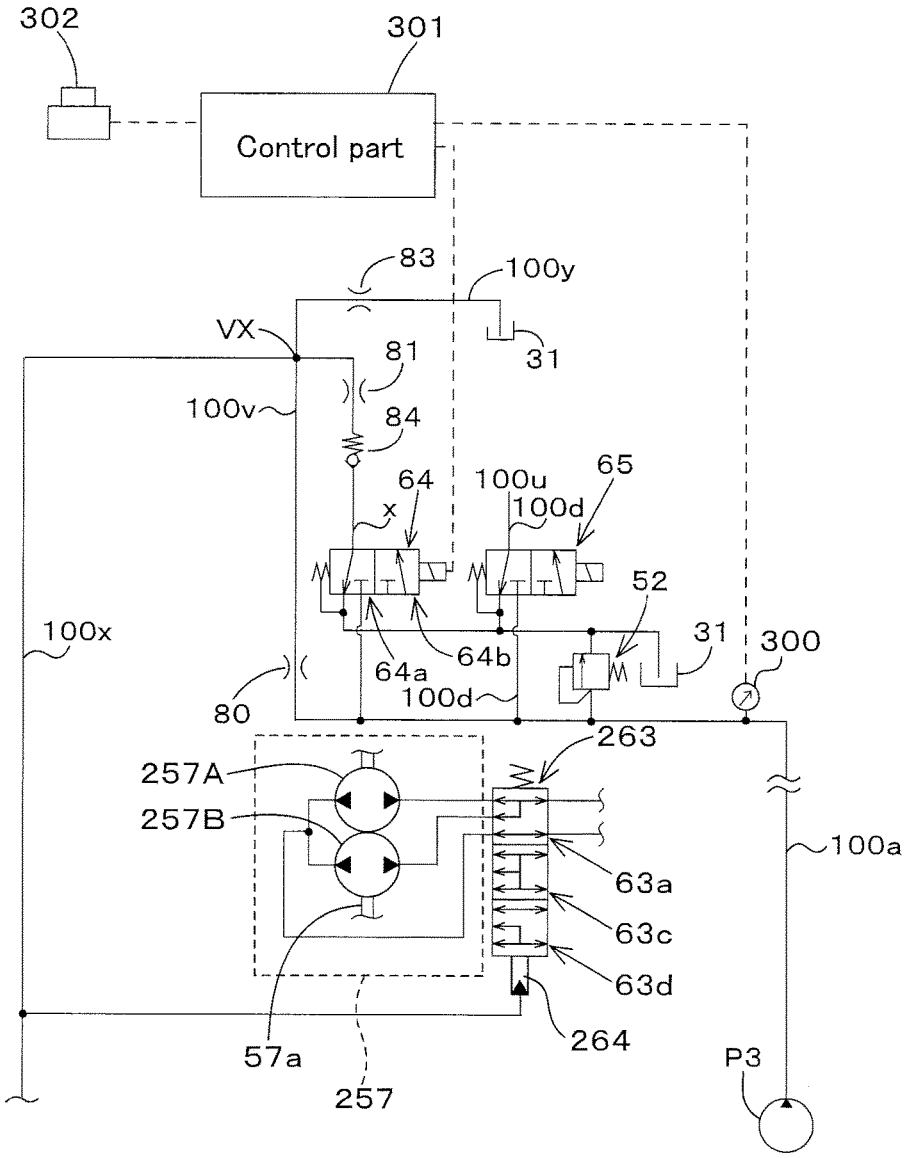
FIG. 18 is a view illustrating a pressure detection part according to a third modified example of the tenth embodiment.

In the tenth embodiment described above, the pressure detection part 300 is disposed on the second fluid tube 100x. However, the pressure detection part 300 may be disposed on the fourth fluid tube 100a as in a third modified example illustrated in FIG. 18. In that case, the control part 301 outputs the first speed command to the direction switch valve 64 when the pilot pressure detected by the pressure detection part 300 is less than the set value under the state where the control part 301 outputs the second speed command. In addition, the control part 301 outputs the second speed command to the direction switch valve 64 when the pilot pressure detected by the pressure detection part 300 is equal to or more than the set value after the outputting of the first speed command to the direction switch valve 64 and the operation member 302 is operated to set the second speed. In the third modified example, the direction switch valve 64 is forcibly switched from the second speed to the first speed when the pilot pressure in the fourth fluid tube 100a is lowered by some condition. After that, when the lowering of the pilot pressure is recovered in the fourth fluid tube 100a, an operator is capable of recovering the direction switch valve 64 from the first speed to the second speed by operating the operation member 302.

Figure 19:
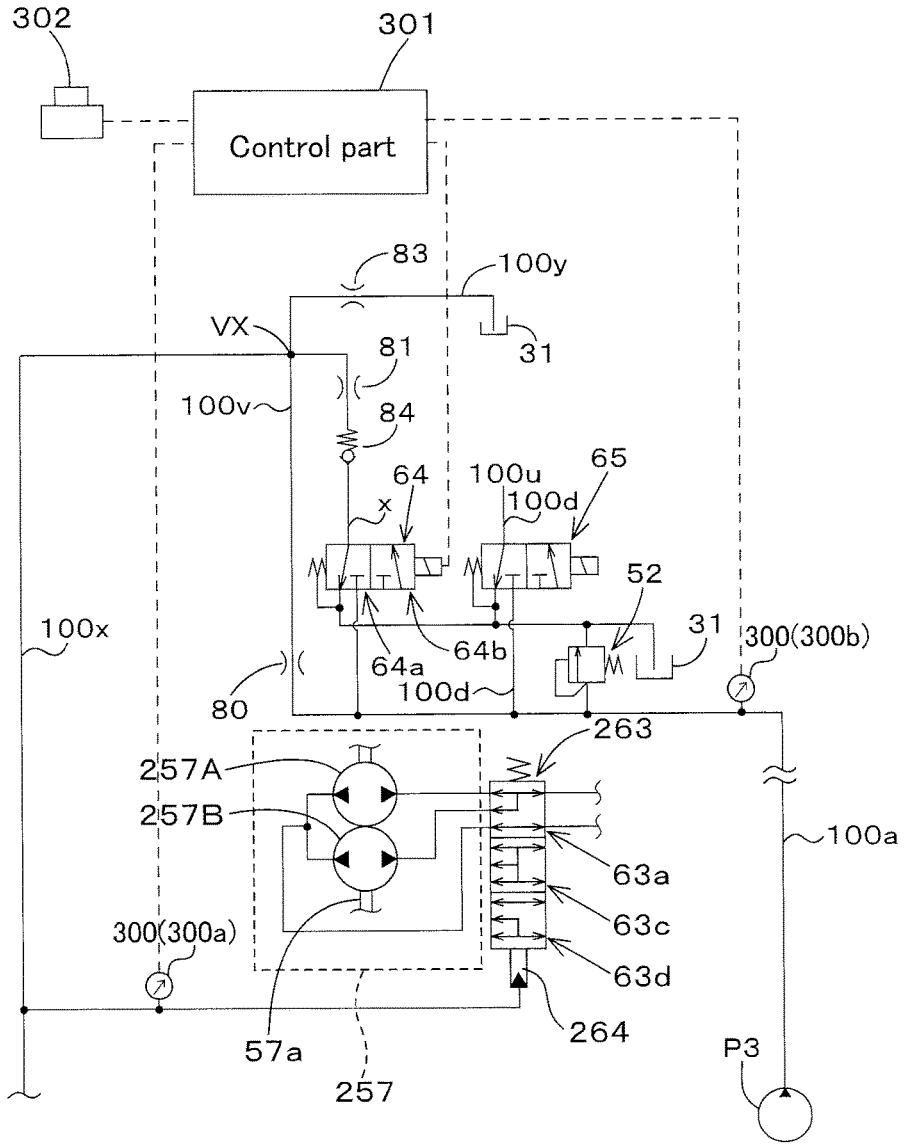
FIG. 19 is a view illustrating the pressure detection part according to a fourth modified example of the tenth embodiment.

In addition, the pressure detection part 300 may be disposed on the second fluid tube 100x and the fourth fluid tube 100a as in a fourth modified example illustrated in FIG. 19. The pressure detection part 300 includes a first pressure detection part (a first pressure sensor) 300a and a second pressure detection part (a second pressure sensor) 300b. The first pressure detection part 300a is disposed on the second fluid tube 100x and configured to detect a pressure of the pilot fluid in the second fluid tube 100x. The second pressure detection part 300b is disposed on the fourth fluid tube 100a and configured to detect a pressure of the pilot fluid in the fourth fluid tube 100a.

The control part 301 outputs the first speed command to the direction switch valve 64 when the pilot pressure detected by the first pressure detection part 300a is less than the set value under a state where the control part 301 outputs the second speed command. Here, the pilot pressure detected by the second pressure detection part 300b may be equal to or more than the set value again after the control part 301 outputs the first speed command to the direction switch valve 64. When the pilot pressure is equal to or more the set value, the control part 301 outputs automatically the second speed command to the direction switch valve 64.

In addition, the control part 301 outputs the second speed command to the direction switch valve 64 when the pilot pressure detected by the second pressure detection part 300b is equal to or more than the set value after the outputting of the first speed command to the direction switch valve 64 and the operation member 302 is operated to set the second speed. In that case, the control part 302 maintains the direction switch valve 64 in the first speed command (at the first position) even when the operation member 302 is operated to set the direction switch valve 64 to the second speed command (to the second position) under a state where the pilot pressure detected by the second pressure detection part 300b is less than the set value.

That is, the control part 302 switches the direction switch valve 64 to the second position 64b when the pilot pressure detected by the second pressure detection part 300b is recovered to be equal to or more than the set value under a state where the direction switch valve 64 is forcibly switched from the second speed to the first speed (a state where a command of switching to the first position 64a is outputted), thereby recovering the direction switch valve 64 to the second speed. The pilot pressure (a recovering pressure) to recover the direction switch valve 64 from the first speed to the second speed may be less than the set value described above, the pilot pressure (the recovering pressure) being detected by the second pressure detection part 300b. For example, the pilot pressure (the recovering pressure) to set the direction switch valve 64 to the second switch position 63b may be identical to the recovering pressure to recover the direction switch valve 64 from the first speed to the second speed. However, the recovering pressure may be different from the set pressure.

Eleventh Embodiment

Figure 14:
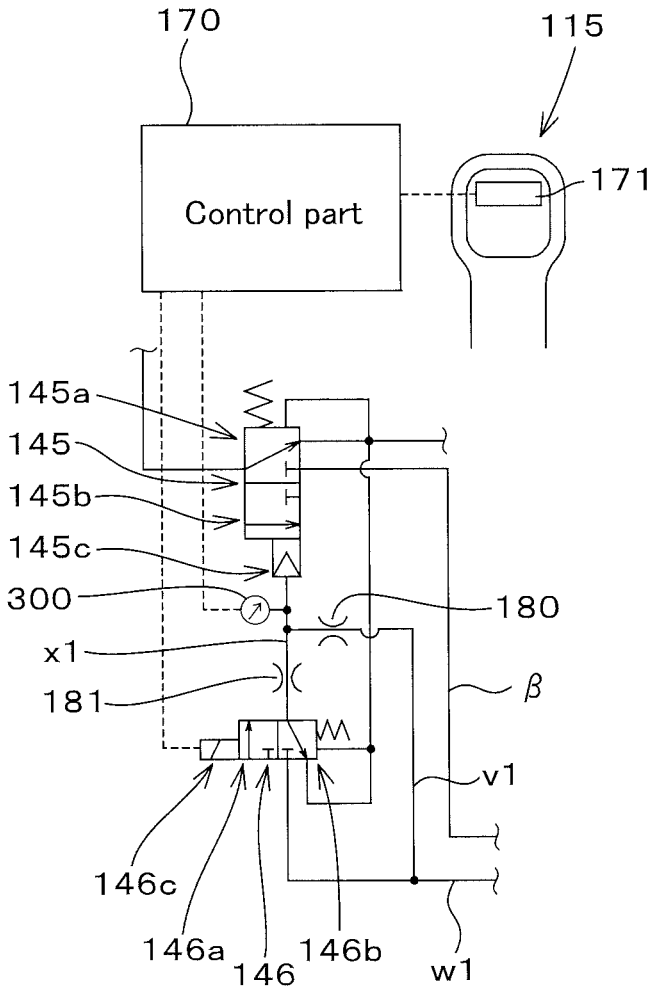
FIG. 14 is a view illustrating a hydraulic circuit of a hydraulic system according to an eleventh embodiment of the present invention.

FIG. 14 illustrates a hydraulic system according to an eleventh embodiment of the present invention. As shown in FIG. 14, the high flow switch valve 146 is controlled based on the pilot pressure in the second fluid tube x1 in the tenth embodiment. In the eleventh embodiment, explanations of configurations similar to the configurations according to the embodiments described above will be omitted.

As shown in FIG. 14, the pressure detection part 300 configured to detect the pilot pressure is connected to the second fluid tube x1 that connects the high flow switch valve 146 to the high flow valve 145. The pressure detected by the pressure detection part 300 is outputted to the control part 170.

When the pilot pressure detected by the pressure detection part 300 is less than the set value and the slide button 171 is operated to set the increasing mode, the control part 170 outputs a command to the solenoid 146c of the high flow switch valve 146, the command (referred to as an increasing command) being provided for setting the high flow switch valve 146 to the applying position (a second position) 146a. That is, the control part 170 magnetizes the solenoid 146c of the high flow switch valve 146.

When the pilot pressure detected by the pressure detection part 300 is less than the predetermined pressure (less than the set value) under the state where the solenoid 146c is magnetized (the state where the increasing command), the control part 170 outputs a command to the solenoid 146c of the high flow switch valve 146, the command (referred to as a non-increasing command) being provided for setting the high flow switch valve 146 to the non-applying position (a first position) 146b. That is, the control part 170 demagnetizes the solenoid 146c of the high flow switch valve 146.

For example, when the pilot pressure in the second fluid tube x1 is increased to be equal to or more than the set pressure after the outputting of the increasing command and then the pilot pressure in the second fluid tube x1 is decreased to be less than the set pressure, the control part 170 outputs the non-increasing command to the high flow switch valve 146. In addition, when the pilot pressure in the second fluid tube x1 is not increased to the set pressure or more after the outputting of the increasing command and then the state staying in being less than the set pressure continues for a predetermined time, the control part 170 outputs the non-increasing command to the high flow switch valve 146.

That is, the control part 170 monitors the pilot pressure in the second fluid tube x1 after the outputting of the increasing command. When the pilot pressure in the second fluid tube x1 is equal to or more than the set value, it can be believed that the high flow valve 146 is at the increasing position 145b in accordance with the increasing command and thus the operation fluid is increased certainly. However, when the pilot pressure in the second fluid tube x1 is less than the set value, the spool of the high flow valve 146 does not move sufficiently regardless of the second speed command outputted by the control part 301. The insufficient movement reduces an amount of the operation fluid flowing into the in the increasing fluid tube β through the high flow valve 146, and thus the operability of the work machine 1 may be deteriorated. For that reason, when the pilot pressure in the second fluid tube x1 is less than the set value after outputting the increasing command to the high flow switch valve 146 and thereby the increasing amount is insufficient, the control part 170 forcibly stops outputting the increasing command and outputs the non-increasing command.

Twelfth Embodiment

Figure 15:
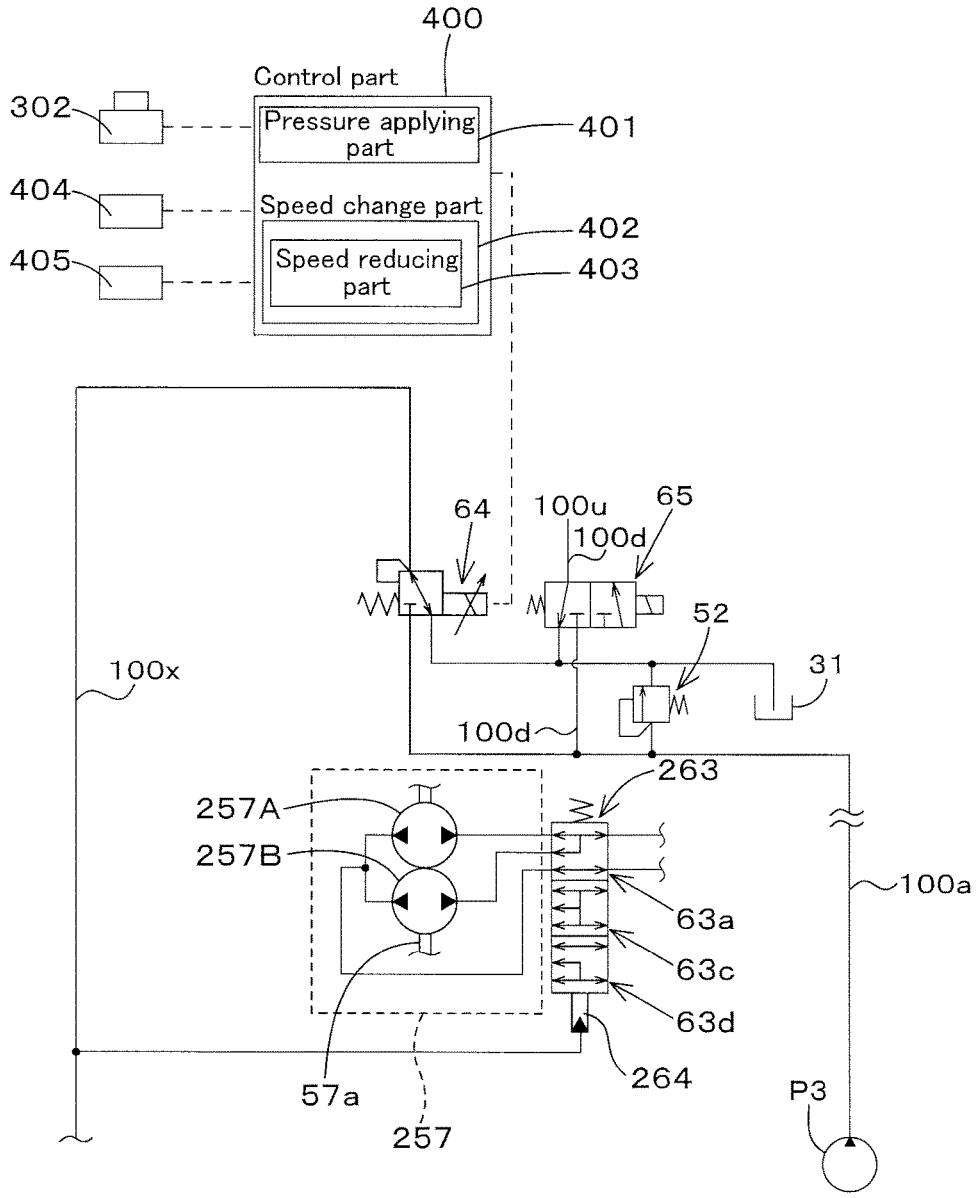
FIG. 15 is a view illustrating a hydraulic circuit of a hydraulic system according to a twelfth embodiment of the present invention.

FIG. 15 to FIG. 17 illustrate a hydraulic system according to a twelfth embodiment of the present invention. The twelfth embodiment is a modified example where the HST motor (the hydraulic motor for traveling), the hydraulic switch valve, the direction switch valve, the pressure applying part, and the speed reducing part are modified. Configurations of the HST motor and the hydraulic switch valve are similar to the configurations described in the ninth embodiment, and thus explanations of the configurations of the HST motor and the hydraulic switch valve will be omitted. In the twelfth embodiment, explanations of configurations similar to the configurations according to the embodiments described above will be omitted.

As shown in FIG. 15, the direction switch valve 64 is connected to a terminal end of the discharge fluid tube 100a of the third pump P3. The direction switch valve 64 is connected to the hydraulic switch valve 263 by the second fluid tube 100x. The direction switch valve 64 is a proportional valve configured to electromagnetically change an aperture of an internal valve due to magnetization, that is, an electromagnetic proportional valve. When the aperture of the proportional valve (the electromagnetic proportional valve) 64 is changed, the changed aperture changes a flow amount of the pilot fluid flowing from the discharge fluid tube 100a to the second fluid tube 100x. That is, the changing of the aperture of the proportional valve 64 changes the pilot pressure applied to the hydraulic switch valve 263.

For example, the pilot pressure applied to the hydraulic switch valve 263 is substantially zero under a state where the proportional valve 64 is closed (a state where the proportional valve 64 is fully closed). As the result, the hydraulic switch valve 263 is at the first position 63a. When the proportional valve 64 fully closed is gradually opened starting from that state and the aperture of the proportional valve 64 is increased, the pilot pressure applied to the hydraulic switch valve 263 increases based on the aperture of the proportional valve.

When the aperture of the proportional valve 64 is increased until the pilot pressure applied to the hydraulic switch valve 263 exceeds the set value, the hydraulic switch valve 263 is switched to the second switch position 63b through the neutral position 63c. That is, the aperture of the proportional valve 64 is proportional to the pilot pressure applied to the hydraulic switch valve 263, and the hydraulic switch valve 263 changes the switching positions in accordance with the aperture of the proportional valve 64.

As for the aperture of the proportional valve 64, the aperture to set the hydraulic switch valve 263 to the first position 63a is referred to as a first aperture, and the aperture to set the hydraulic switch valve 263 to the second position 63b is referred to as a second aperture, for convenience in explanation. In addition, the aperture corresponding to a border on which the hydraulic switch valve 263 is switched from the first position 63a to the neutral position 63c is referred to as a first border value, and the aperture corresponding to a border on which the hydraulic switch valve 263 is switched from the neutral position 63c to the second position 63b is referred to as a second border value.

The proportional valve 64 is connected to a control part (a controller) 400. The control part 400 controls the aperture of the proportional valve 64 in accordance with the operation of the operation member 302. Configurations of the operation member 302 are similar to the configurations described in the tenth embodiment.

The control by the control part 400 will be explained next.

When the operation member 302 is operated to the first speed, the control part 400 outputs a command of an electric current or the like (a control signal) to the proportional valve 64, and sets the aperture of the proportional valve 64 to the first aperture. When the operation member 302 is operated to the second speed, the control part 400 outputs another command of an electric current or the like (another control signal) to the proportional valve 64, and sets the aperture of the proportional valve 64 to the second aperture.

The control part 400 includes a pressure applying part (a pressure applying device) 401. The pressure applying part 401 is constituted of an electric circuit, an electronic circuit, a computer program, or the like. As described later, the pressure applying part 401 outputs a command (a control command) to the proportional valve 64 and thereby sets the aperture of the proportional valve 64.

Figure 16A:
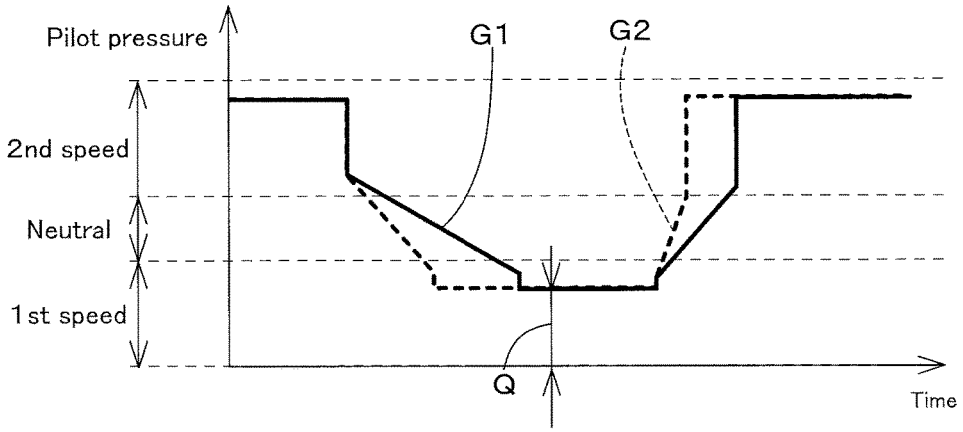
FIG. 16A is a first view illustrating change of a pilot pressure (an aperture) according to the twelfth embodiment.

When the operation member 302 is operated to the first speed, the pressure applying part 401 sets the aperture of the proportional valve 64 not to zero but to a value near the first border value. As shown in FIG. 16A, when the aperture of the proportional valve 64 is equal to or more than zero and less than the first border value, the hydraulic switch valve 263 is at the first position 63a and the HST motor 257 is at the first speed. When the aperture of the proportional valve 64 exceeds the first border value, the hydraulic switch valve 263 is at the neutral position 63c.

When the operation member 302 is operated to the first speed, the pressure applying part 401 sets the aperture of the proportional valve 64 to a value that is close to the first border value as close as possible in a range of the first aperture. That is, when the operation member 302 is operated to the first speed, the pressure applying part 401 does not fully close the proportional valve 64 but sets the proportional valve 64 to an aperture just slightly smaller than the aperture to switch the hydraulic switch valve 263 to the neutral position 63c.

As shown in FIG. 16A, the aperture of the proportional valve 64 is set to a predetermined value Q within a range of the first aperture. When the operation member 302 is operated to the second speed, the control part 400 increases the aperture of the proportional valve 64 and thereby sets the aperture of the proportional valve 64 to the second aperture.

In this manner, when the operation member 302 is operated to the first speed, the pressure applying part 401 sets and holds the aperture of the proportional valve 64 to a value near the first border value, and thus sets the pressure of the pilot fluid flowing in the second fluid tube 100x to be close to the pilot pressure to switch the hydraulic switch valve 263 to the neutral position 63c and holds the pressure of the pilot fluid, the neutral position 63c being one of the predetermined switching positions. As the result, when the operation member 302 is operated from the first speed to the second speed, the hydraulic switch valve 263 is switched to the second speed quickly.

In addition, the control part 400 includes a speed change part (a speed controller) 402.

The speed change part 402 is constituted of an electric circuit, an electronic circuit, a computer program, or the like. The speed change part 402 includes a speed reducing part (a speed reducer) 403. As shown by reference numerals G1 and G2 in FIG. 16A, when the hydraulic switch valve 263 is switched from the first speed to the second speed, the speed reducing part 402 changes a speed of opening a valve of the proportional valve 64 and thereby changes a speed of increasing the pilot pressure applied to the hydraulic switch valve 263. In addition, when the hydraulic switch valve 263 is switched from the second speed to the first speed, the speed reducing part 402 (the speed reducing part 403) changes a speed of closing the valve of the proportional valve 64 and thereby changes a speed of decreasing the pilot pressure applied to the hydraulic switch valve 263.

A first travel detection part 404 is connected to the control part 400, the first travel detection part 404 being configured to detect a travel speed (a ground speed) of the work machine 1. The first travel detection part 404 is constituted of a vehicle speed sensor or the like, the vehicle speed sensor being configured to detect a vehicle speed of the work machine 1. The first travel detection part 404 may be any of components configured to detect the traveling of the work machine 1.

As for the opening-closing speed (the changing speed) that is a speed of opening and closing the proportional valve 64, the speed change part 402 is configured to set a first opening-closing speed (a first changing speed) (a control value) G1 corresponding to a first speed (that is equal to or more than a predetermined value and is a high speed) when the travel speed is at the first speed and set a second opening-closing speed (a second changing speed) (a control value) G2 corresponding to a second speed (that is less than the high speed) when the travel speed is at the second speed lower than the first speed, as shown in FIG. 16A. That is, when the travel speed detected by the first travel detection part 404 is equal to or more than a predetermined value and is a high speed, the speed change part 402 sets the opening-closing speed of the proportional valve 64 to the control value G1 in changing the speed (in the switching from the first speed to the second speed or in the switching from the second speed to the first speed), the control value G1 being the first opening-closing speed smaller than the control value G2 that is the second opening-closing speed.

That is, when the travel speed is a high speed, the speed change part 402 decreases the opening-closing speed of the proportional valve 64 in the changing of speed than the low speed. Thus, the speed reducing part 402 reduces the opening-closing speed of the proportional valve 64 and thereby reduces the speed of varying the pilot pressure applied from the second fluid tube 100x to the hydraulic switch valve 263. In this manner, when the travel speed is a high speed, time of the neutral position 63 of the hydraulic switch valve 263 (time of being neutral) can be long, and thereby absorbing a shock of the changing of speed.

On the other hand, when the travel speed is a low speed, the speed change part 402 sets the opening-closing speed of the proportional valve 64 to the control value G2 in the changing of speed as shown in FIG. 16A, the control value G2 being the second opening-closing speed larger than the control value G1 that is the first opening-closing speed as shown in FIG. 16A. That is, when the travel speed is a low speed, the speed change part 402 increases the opening-closing speed of the proportional valve 64 in the changing of speed than the high speed. In this manner, when the travel speed is a low speed, the time of being neutral can be short, and thereby preventing vibrations due to the changing of speed.

In the embodiments described above, the speed change part 402 changes the opening-closing speed of the proportional valve 64 in accordance with the travel speed. However, the speed change part 402 may change the opening-closing speed of the proportional valve 64 on the basis of various conditions. A modified example of the present embodiment will be explained below. For convenience of explanation, the changing of speed from the first speed to the second speed is referred to as an increasing speed, and the changing of speed from the second speed to the first speed is referred to as a reducing speed.

On a fifth modified example, the opening-closing speed of the proportional valve 64 is changed depending on detection of operations being in traveling and being in non-traveling. In employment of the fifth modified example, a second travel detection part (a second travel sensor) 405 is connected to the control part 400 as shown in FIG. 15. The second travel detection part 405 is constituted of a vehicle speed sensor or the like, the vehicle speed sensor being configured to detect a vehicle speed of the work machine 1. The second travel detection part 405 may be any of components configured to detect the operations being in traveling and being in non-traveling of the work machine 1. For example, the second travel detection part 405 may be a device configured to detect the operations being in traveling and being in non-traveling on the basis of the operation of the operation member for traveling, and may be a device configured to detect the operations being in traveling and being in non-traveling on the basis of the pilot pressure in a remote control valve for traveling.

Figure 16B:
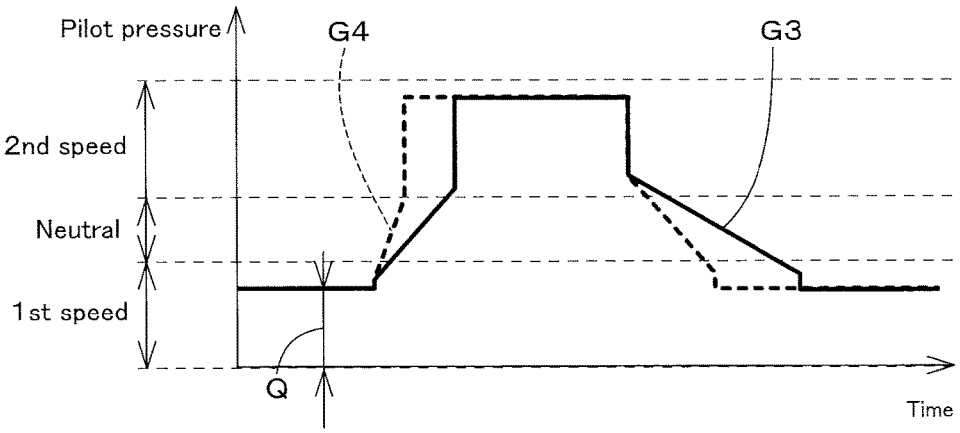
FIG. 16B is a second view illustrating change of the pilot pressure (the aperture) according to the twelfth embodiment.

As for the opening-closing speed that is a speed of opening and closing the proportional valve 64, the speed change part 402 is configured to set a third opening-closing speed (a third changing speed) (a control value) G3 corresponding to the operation being in traveling and set a fourth opening-closing speed (a fourth changing speed) (a control value) G4 corresponding to the operation being in non-traveling, as shown in FIG. 16B. That is, the speed change part 402 is capable of changing the opening-closing speed of the proportional valve 64 on the basis of detection of the operations being in traveling and being in non-traveling. When a vehicle speed measured by the second travel detection part 405 exceeds zero and thereby the second travel detection part 405 determines that the work machine 1 is in traveling (detects the operation being in traveling), the speed change part 402 decreases (reduces) the opening-closing speed of the proportional valve 64 in the changing of speed as shown in the third opening-closing speed (the control value) G3. On the other hand, when a vehicle speed measured by the second travel detection part 405 is zero and thereby the second travel detection part 405 determines that the work machine 1 is not in traveling (detects the operation being in non-traveling), the speed change part 402 increases the opening-closing speed of the proportional valve 64 in the changing of speed as shown in the fourth opening-closing speed (the control value) G4.

In a sixth modified example, the opening-closing speed of the proportional valve 64 is changed during the work machine 1 climbs a slope. In a case of the increasing speed under a state where the work machine 1 climbs a slope, the speed change part 402 decreases the opening-closing speed of the proportional valve 64 in the changing of speed. In this manner, that configuration absorbs (relieves) a shock caused in the case of the increasing speed under the state where the work machine 1 climbs a slope. On the other hand, in a case of the reducing speed under the state where the work machine 1 climbs a slope, the speed change part 402 increases the opening-closing speed of the proportional valve 64 in the changing of speed. In this manner, that configuration suppresses a temporary speed down caused in the case of the reducing speed under the state where the work machine 1 climbs a slope.

In a seventh modified example, the opening-closing speed of the proportional valve 64 is changed during the work machine 1 descends a slope. In a case of the increasing speed under a state where the work machine 1 descends a slope, the speed change part 402 increases the opening-closing speed of the proportional valve 64 in the changing of speed. In this manner, that configuration improves responsibility to the increasing speed even under the state where the work machine 1 descends a slope, and thereby improving an operability to the increasing speed. On the other hand, in a case of the decreasing speed under the state where the work machine 1 descends a slope, the speed change part 402 decreases (reduces) the opening-closing speed of the proportional valve 64 in the changing of speed. In this manner, that configuration absorbs (relieves) a shock caused in the case of the decreasing speed under the state where the work machine 1 descends a slope.

Meanwhile, the climbing and the descending of the work machine 1 are determined by an angle sensor mounted on the work machine 1. The angle sensor is disposed on the machine frame 2, the angle sensor being configured to detect an angle with respect to a horizontal direction. The angle sensor is connected to the control part 400. The control part 400 judges whether the work machine 1 climbs or descends a slope on the basis of an angle detected by the angle sensor.

In an eighth modified example, the opening-closing speed of the proportional valve 64 is changed on the basis of a temperature of an operation fluid (a fluid temperature). In a case of the increasing speed under a state where the temperature of the operation fluid is low, the speed change part 402 decreases the opening-closing speed of the proportional valve 64 in the changing of speed. On the other hand, in a case of the reducing speed under the state where the temperature of the operation fluid is low, the speed change part 402 increases the opening-closing speed of the proportional valve 64 in the changing of speed. In this manner, that configuration improves an operability to the changing of speed under a state where travel load is increased because of the low temperature of the operation fluid.

Meanwhile, the temperature of the operation fluid is determined by a temperature sensor mounted on the work machine 1. The temperature sensor is disposed on the machine frame 2, the temperature sensor being configured to detect a temperature of the operation fluid flowing in the second fluid tube 100x. The temperature sensor is connected to the control part 400. The control part 400 judges whether the fluid temperature is low or not on the basis of the fluid temperature detected by the temperature sensor. The low temperature corresponds to a temperature range where a viscosity of the operation fluid is extremely high, the operation fluid having a viscosity grade generally used in the work machine 1. Thus, a hydraulic pressure in a fluid tube (a fluid path) results in being easily increased due to the high viscosity. Additionally, in a case where a temperature of the operation fluid and an outside temperature are low and the first speed is held, it is preferable for the aperture of the proportional valve to be increased to an aperture slightly smaller than the aperture to switch the hydraulic switch valve 263 to the second position 63b.

In a ninth modified example, the opening-closing speed of the proportional valve 64 is changed on the basis of a travel load. The travel load is a load applied to traveling apparatuses when the work machine 1 travels. For example, a pressure of the operation fluid (a travel pressure) applied to the travel motors 21L and 21R is the travel load, and a load applied to the engine also is the travel load. When the travel pressure is high, the speed change part 402 increase the opening-closing speed of the proportional valve 64 in the changing of speed. Or, when the engine revolution speed is lower than a target revolution speed, the speed change part 402 increase the opening-closing speed of the proportional valve 64 in the changing of speed. Or, when a fuel injection amount injected into cylinders of the engine is large and a large load is applied to the engine, the speed change part 402 increase the opening-closing speed of the proportional valve 64 in the changing of speed.

Figure 17A:
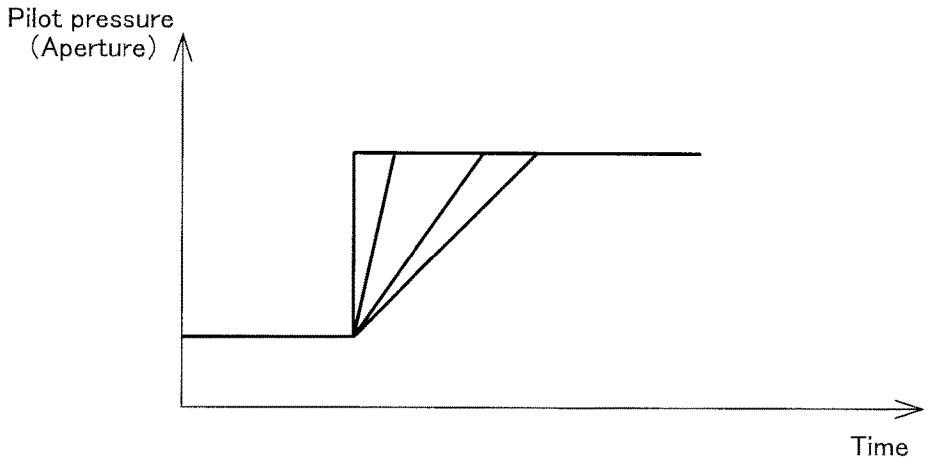
FIG. 17A is a view illustrating a case of linearly changing an opening-closing speed of a proportional valve according to the twelfth embodiment.
Figure 17B:
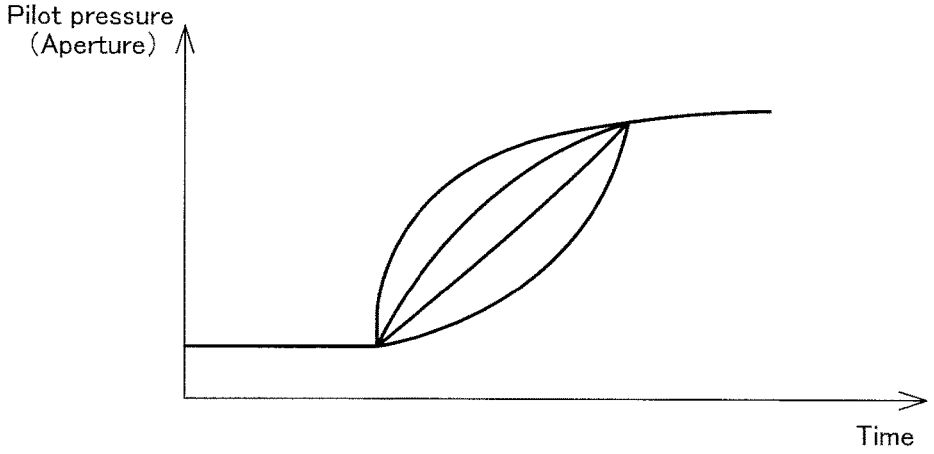
FIG. 17B is a view illustrating a case of changing in a curve line the opening-closing speed of the proportional valve according to the twelfth embodiment.
Figure 17C:
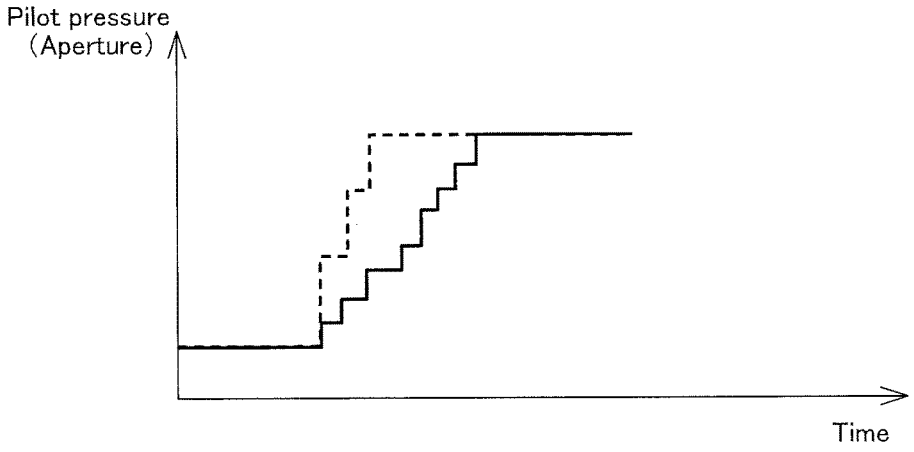
FIG. 17C is a first view illustrating a case of changing in a stepwise manner the opening-closing speed of the proportional valve according to the twelfth embodiment.
Figure 17D:
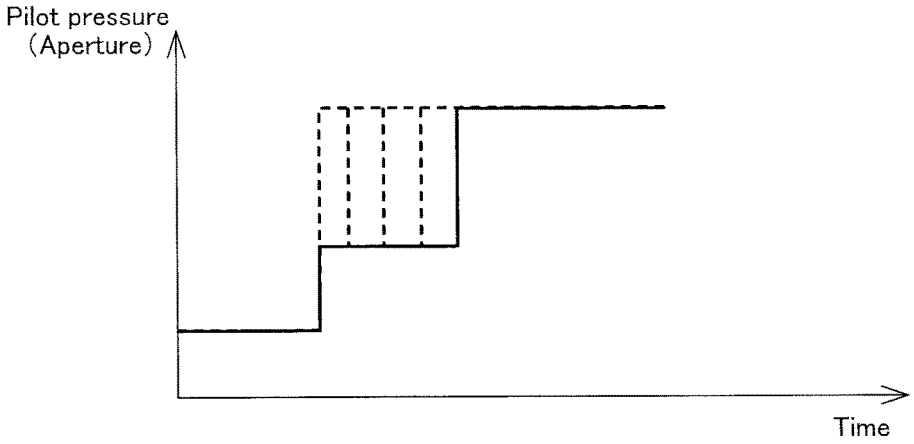
FIG. 17D is a second view illustrating a case of changing in a stepwise manner the opening-closing speed of the proportional valve according to the twelfth embodiment.

Meanwhile, a method of increasing and decreasing (changing) the opening-closing speed of the proportional valve 64 in the speed change part may linearly increase and decrease the opening-closing speed on the basis of passage of time as shown in FIG. 17A. In addition, the method may increase and decrease in a curve line the opening-closing speed on the basis of passage of time as shown in FIG. 17B, and the method may increase and decrease in a stepwise manner the opening-closing speed on the basis of passage of time as shown in FIG. 17C and FIG. 17D.

According to the embodiments and the modified examples described above, a responsibility to an operation with the hydraulic switch valve switched (an operation of the speed changing) is improved in the hydraulic system for the work machine. In addition, a flow of the fluid is prevented from being rapidly changed by the switching of the hydraulic switch valve, and thereby preventing a shock generated in the operation of changing speed and preventing a surge pressure from being generated in the operation of increasing the operation fluid.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

In the eighth embodiment, the first modified example, and the second modified example, the first fluid tube v1 connects the second fluid tube x1 to the interlocking fluid tube w. However, the first fluid tube v1 may connect the second fluid tube x1 to the pilot pressure supply tube s instead of that configuration.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic system for a work machine, comprising:

a hydraulic pump to supply a pilot fluid;

a hydraulic switch valve to be switched to a plurality of switching positions based on a pilot pressure, the pilot pressure being a pressure of the pilot fluid supplied from the hydraulic pump;

a direction switch valve to apply a first pilot pressure to the hydraulic switch valve to switch the hydraulic switch valve into one of the plurality of switching positions; and a pressure applying device to apply a second pilot pressure to the hydraulic switch valve, the second pilot pressure being lower than the first pilot pressure, wherein the pressure applying device includes a [second] fluid tube connecting the direction switch valve to the hydraulic switch valve,

[a fourth] *an other* fluid tube connecting the hydraulic pump to the direction switch valve, and a [fourth] throttle to set the pilot pressure in the direction switch valve to the second pilot pressure.

2. The hydraulic system according to claim 1, wherein the pressure applying device includes a [first] *further* fluid tube connecting the hydraulic pump to the hydraulic switch valve, and

[a first] *an other* throttle to set the pilot pressure in the [first] *further* fluid tube to the second pilot pressure.

3. The hydraulic system according to claim 1, comprising:

a [first] check valve provided in the [second] fluid tube, the pilot fluid being to flow from the direction switch valve to the hydraulic switch valve through the [first] check valve, the pilot fluid being prevented from flowing from the hydraulic switch valve to the direction switch valve through the [first] check valve.

4. The hydraulic system according to claim 3, comprising:

a coupler provided in the [second] fluid tube to couple an upper stream portion of the [first] check valve to a downstream portion of the [first] check valve; and

[a fifth] *an other* throttle provided in the coupler to reduce a speed at which the pilot fluid flows in the coupler.

5. The hydraulic system according to claim 4, wherein the coupler is a branched fluid tube to couple the upper stream portion of the [first] check valve to the downstream portion of the [first] check valve, the branched fluid tube being arranged to be in a parallel connection with the [first] check valve.

6. The hydraulic system according to claim 1, wherein the hydraulic switch valve includes a spool to be switched to a plurality of switch positions.

7. A work machine comprising the hydraulic system according to claim 1.

8. A hydraulic system for a work machine, comprising:

a hydraulic pump to supply a pilot fluid;

a hydraulic switch valve to be switched to a plurality of switching positions based on a pilot pressure, the pilot pressure being a pressure of the pilot fluid supplied from the hydraulic pump;

a direction switch valve to apply a first pilot pressure to the hydraulic switch valve to switch the hydraulic switch valve into one of the plurality of switching positions; and a speed reducing device to reduce a speed of changing the pilot pressure to be changed to the first pilot pressure, wherein the speed reducing device includes a [second] fluid tube connecting the direction switch valve to the hydraulic switch valve, a [second] throttle to reduce the pilot pressure in the [second] fluid tube,

[a third] *an other* fluid tube connecting the hydraulic switch valve to a tank to which the pilot fluid is to be discharged from the hydraulic switch valve, and

[a third] *an other* throttle to reduce an amount of the pilot fluid flowing in the [third] *other* fluid tube, wherein the [second] throttle and the [third] *other* throttle reduce the speed of changing the pilot pressure.

9. The hydraulic system according to claim 8, comprising:

a [second] check valve provided in the [third] *other* fluid tube, the pilot fluid being to flow from the hydraulic switch valve to the tank through the [second] check valve, the pilot fluid being prevented from flowing from the tank to the hydraulic switch valve through the [second] check valve.

10. A hydraulic system for a work machine, comprising:

a hydraulic pump to supply a pilot fluid;

a hydraulic switch valve to be switched to a plurality of switching positions based on a pilot pressure, the pilot pressure being a pressure of the pilot fluid supplied from the hydraulic pump;

a direction switch valve to apply a first pilot pressure to the hydraulic switch valve to switch the hydraulic switch valve into one of the plurality of switching positions;

a pressure applying device to apply a second pilot pressure to the hydraulic switch valve, the second pilot pressure being lower than the first pilot pressure; and a speed reducing device to reduce a speed of changing the pilot pressure, the pilot pressure being to be applied to the hydraulic switch valve and to be changed to the first pilot pressure.

11. The hydraulic system according to claim 10, wherein the pressure applying device includes a [second] fluid tube connecting the direction switch valve to the hydraulic switch valve,

[a fourth] *an other* fluid tube connecting the hydraulic pump to the direction switch valve, and a [fourth] throttle to set the pilot pressure in the direction switch valve to the second pilot pressure.

12. The hydraulic system according to claim 11, comprising:

a [first] check valve provided in the [second] fluid tube, the pilot fluid being to flow from the direction switch valve to the hydraulic switch valve through the [first] check valve, the pilot fluid being prevented from flowing from the hydraulic switch valve to the direction switch valve through the [first] check valve.

13. The hydraulic system according to claim 12, comprising:

a coupler provided in the [second] fluid tube to couple an upper stream portion of the [first] check valve to a downstream portion of the [first] check valve; and

[a fifth] *an other* throttle provided in the coupler to reduce a speed at which the pilot fluid flows in the coupler.

14. The hydraulic system according to claim 13, wherein the coupler is a branched fluid tube to couple the upper stream portion of the [first] check valve to the downstream portion of the [first] check valve, the branched fluid tube being arranged to be in a parallel connection with the [first] check valve.

15. The hydraulic system according to claim 10, wherein the speed reducing device includes a [second] fluid tube connecting the direction switch valve to the hydraulic switch valve, a [second] throttle to reduce the pilot pressure in the [second] fluid tube,

[a third] *an other* fluid tube connecting the hydraulic switch valve to a tank to which the pilot fluid is to be discharged from the hydraulic switch valve, and

[a third] *an other* throttle to reduce an amount of the pilot fluid flowing in the [third] *other* fluid tube, wherein the [second] throttle and the [third] *other* throttle reduce the speed of changing the pilot pressure.

16. The hydraulic system according to claim 15, comprising:

a [second] check valve provided in the [third] *other* fluid tube, the pilot fluid being to flow from the hydraulic switch valve to the tank through the [second] check valve, the pilot fluid being prevented from flowing from the tank to the hydraulic switch valve through the [second] check valve.

17. A hydraulic system for a work machine, comprising:

a hydraulic pump to supply a pilot fluid;

a hydraulic switch valve to be switched to a plurality of switching positions based on a pilot pressure, the pilot pressure being a pressure of the pilot fluid supplied from the hydraulic pump;

a direction switch valve to apply a first pilot pressure to the hydraulic switch valve to switch the hydraulic switch valve into one of the plurality of switching positions;

a pressure applying device to apply a second pilot pressure to the hydraulic switch valve, the second pilot pressure being lower than the first pilot pressure;

a [second] fluid tube connecting the direction switch valve to the hydraulic switch valve;

[a fourth] *an other* fluid tube connecting the hydraulic pump to the direction switch valve; and a discharge fluid tube which is connected to the direction switch valve and through which the pilot fluid in the [second] fluid tube is to be introduced from the direction switch valve, wherein the direction switch valve is switchable between a first position and a second position, the direction switch valve being switched to the first position such that the [second] fluid tube communicates with the discharge fluid tube to relieve the pilot fluid in the [second] fluid tube, the direction switch valve being switched to the second position such that the [fourth] *other* fluid tube communicates with the [second] fluid tube to apply the first pilot pressure to the hydraulic switch valve.

18. The hydraulic system according to claim 17, comprising:

a pressure sensor to detect a pilot pressure in the [second] fluid tube; and a controller to output a command to switch the direction switch valve to the first position when the pilot pressure detected by the pressure sensor is less than a third pilot pressure while the controller outputs a command to switch the direction switch valve to the second position.

19. The hydraulic system according to claim 17, comprising:

a pressure sensor to detect a pilot pressure in the [fourth] *other* fluid tube; and a controller to output a command to switch the direction switch valve to the first position when the pilot pressure detected by the pressure sensor is less than a third pilot pressure while the controller outputs a command to switch the direction switch valve to the second position.

20. The hydraulic system according to claim 19, wherein the controller is to output the command to switch the direction switch valve to the second position when the pilot pressure detected by the pressure sensor is equal to or more than the third pilot pressure while the controller outputs the command to switch the direction switch valve to the first position.

21. The hydraulic system according to claim 19, comprising:

an operation member connected to the controller to be manipulated to operate the direction switch valve, wherein the controller holds the direction switch valve at the first position even when the operation member is manipulated in order to switch the direction switch valve to the second position while the pilot pressure detected by the pressure sensor is less than the third pilot pressure.

22. The hydraulic system according to claim 17, comprising:

a first pressure sensor to detect the pilot pressure in the [second] fluid tube;

a second pressure sensor to detect the pilot pressure in the [fourth] *other* fluid tube; and a controller to output the command to switch the direction switch valve to the first position when the pilot pressure detected by the pressure sensor is less than a third pilot pressure while the controller outputs the command to switch the direction switch valve to the second position and to output the command to switch the direction switch valve to the second position when the pilot pressure detected by the pressure sensor is equal to or more than the third pilot pressure while the controller outputs the command to switch the direction switch valve to the first position.

23. A hydraulic system for a work machine, comprising:

a hydraulic pump to supply a pilot fluid;

a hydraulic switch valve to be switched to a plurality of switching positions based on a pilot pressure, the pilot pressure being a pressure of the pilot fluid supplied from the hydraulic pump;

a direction switch valve to apply a first pilot pressure to the hydraulic switch valve to switch the hydraulic switch valve into one of the plurality of switching positions;

a speed reducing device to reduce a speed of changing the pilot pressure to be changed to the first pilot pressure;

a [second] fluid tube connecting the direction switch valve to the hydraulic switch valve;

[a fourth] *an other* fluid tube connecting the hydraulic pump to the direction switch valve; and a discharge fluid tube which is connected to the direction switch valve and through which the pilot fluid in the [second] fluid tube is to be introduced from the direction switch valve, wherein the direction switch valve is switchable between a first position and a second position, the direction switch valve being switched to the first position such that the [second] fluid tube communicates with the discharge fluid tube to relieve the pilot fluid in the [second] fluid tube, the direction switch valve being switched to the second position such that the [fourth] *other* fluid tube communicates with the [second] fluid tube to apply the first pilot pressure to the hydraulic switch valve.

24. A hydraulic system for a work machine, comprising:

a hydraulic pump to supply a pilot fluid;

a hydraulic switch valve to be switched to a plurality of switching positions based on a pilot pressure, the pilot pressure being a pressure of the pilot fluid supplied from the hydraulic pump;

a direction switch valve to apply a first pilot pressure to the hydraulic switch valve to switch the hydraulic switch valve into one of the plurality of switching positions;

a pressure applying device to apply a second pilot pressure to the hydraulic switch valve, the second pilot pressure being lower than the first pilot pressure; and a [second] fluid tube connecting the direction switch valve to the hydraulic switch valve, wherein the direction switch valve is a proportional valve to change an aperture to change a pilot pressure that is a pressure of the pilot fluid flowing in the [second] fluid tube, and wherein the pressure applying device is to set the aperture of the proportional valve to maintain the pilot pressure in the [second] fluid tube to be less than the first pilot pressure.

25. A hydraulic system for a work machine, comprising:

a hydraulic pump to supply a pilot fluid;

a hydraulic switch valve to be switched to a plurality of switching positions based on a pilot pressure, the pilot pressure being a pressure of the pilot fluid supplied from the hydraulic pump;

a direction switch valve to apply a first pilot pressure to the hydraulic switch valve to switch the hydraulic switch valve into one of the plurality of switching positions;

a speed reducing device to reduce a speed of changing the pilot pressure to be changed to the first pilot pressure;

a [second] fluid tube connecting the direction switch valve to the hydraulic switch valve; and a speed controller to control a speed of changing the pilot pressure to be changed to the first pilot pressure, wherein the direction switch valve is a proportional valve to change an aperture to change the pilot pressure in the [second] fluid tube, and wherein the speed controller includes the speed [reducer] *reducing device* to [change a] *reduce the* speed of changing the aperture of the proportional valve to reduce the speed of changing the pilot pressure to be changed to the first pilot pressure.

26. A hydraulic system for a work machine, comprising:

a hydraulic pump to supply a pilot fluid;

a hydraulic switch valve to be switched to a plurality of switching positions based on a pilot pressure, the pilot pressure being a pressure of the pilot fluid supplied from the hydraulic pump;

a direction switch valve to apply a first pilot pressure to the hydraulic switch valve to switch the hydraulic switch valve into one of the plurality of switching positions;

a speed reducing device to reduce a speed of changing the pilot pressure to be changed to the first pilot pressure;

a [second] fluid tube connecting the direction switch valve to the hydraulic switch valve; and a speed controller including the speed [reducer] *reducing device* to [change a] *reduce the* speed of changing the pilot pressure to be changed to the first pilot pressure; and a [first] travel sensor to detect a travel speed, wherein the direction switch valve is a proportional valve to change an aperture to change the pilot pressure in the [second] fluid tube, wherein the speed controller is to set a speed of changing the aperture of the proportional valve to a first changing speed corresponding to a first speed when the travel speed is the first speed, and to set the speed of changing the aperture of the proportional valve to a second changing speed corresponding to a second speed when the travel speed is the second speed, and wherein the first changing speed is lower than the second changing speed.

27. A hydraulic system for a work machine, comprising:

a hydraulic pump to supply a pilot fluid;

a hydraulic switch valve to be switched to a plurality of switching positions based on a pilot pressure, the pilot pressure being a pressure of the pilot fluid supplied from the hydraulic pump;

a direction switch valve to apply a first pilot pressure to the hydraulic switch valve to switch the hydraulic switch valve into one of the plurality of switching positions;

a speed reducing device to reduce a speed of changing the pilot pressure to be changed to the first pilot pressure;

a [second] fluid tube connecting the direction switch valve to the hydraulic switch valve;

a speed controller including the speed [reducer] *reducing device* to [change a] *reduce the* speed of changing the pilot pressure to be changed to the first pilot pressure; and

[a second travel sensor to detect an operation being in traveling and an operation being in non-traveling] *a travel detector to detect whether a travel speed is zero in a non-traveling state or the travel speed is greater than zero in a traveling state*, wherein the direction switch valve is a proportional valve to change an aperture to change the pilot pressure in the [second] fluid tube, wherein the speed controller is to set a speed of changing the aperture of the proportional valve to a [third] changing speed corresponding to [a state of] *the* traveling *state* and to [a fourth] *an other* changing speed corresponding to [a state of] *the* non-traveling *state*, and wherein the [third] changing speed is lower than the [fourth] *other* changing speed.

* * * * *